(12) United States Patent
Wang et al.

(10) Patent No.: US 9,001,051 B2
(45) Date of Patent: Apr. 7, 2015

(54) INFORMATION PROCESSING APPARATUS, DISPLAY METHOD, AND DISPLAY PROGRAM

(75) Inventors: Qihong Wang, Tokyo (JP); Akiko Terayama, Tokyo (JP); Ryo Takaoka, Tokyo (JP); Satoshi Akagawa, Tokyo (JP); Koji Arai, Tokyo (JP); Shunichi Kasahara, Kanagawa (JP)

(73) Assignee: Sony Corporation, Tokyo (JP)

(*) Notice: Subject to any disclaimer, the term of this patent is extended or adjusted under 35 U.S.C. 154(b) by 348 days.

(21) Appl. No.: 12/839,511

(22) Filed: Jul. 20, 2010

(65) Prior Publication Data

US 2011/0018827 A1    Jan. 27, 2011

(30) Foreign Application Priority Data

Jul. 27, 2009 (JP) ................... 2009-174430

(51) Int. Cl.
| | |
|---|---|
| G06F 3/041 | (2006.01) |
| G06F 3/0485 | (2013.01) |
| G06F 3/0482 | (2013.01) |
| G06F 3/0486 | (2013.01) |
| G06F 3/0488 | (2013.01) |
| H04N 5/232 | (2006.01) |

(52) U.S. Cl.
CPC ............ *G06F 3/0485* (2013.01); *G06F 3/0482* (2013.01); *G06F 3/0486* (2013.01); *G06F 3/0488* (2013.01); *G06F 3/04883* (2013.01); *H04N 5/23216* (2013.01); *H04N 5/23293* (2013.01)

(58) Field of Classification Search
CPC ............. G06F 3/041; G09G 5/08; G06K 9/00
USPC ................... 345/157, 173; 715/172
See application file for complete search history.

(56) References Cited

U.S. PATENT DOCUMENTS

| | | | |
|---|---|---|---|
| 2006/0161846 A1* | 7/2006 | Van Leeuwen ............... 715/702 |
| 2006/0244727 A1 | 11/2006 | Salman et al. | |
| 2008/0048993 A1* | 2/2008 | Yano ............................. 345/173 |
| 2009/0167702 A1* | 7/2009 | Nurmi ........................... 345/173 |
| 2009/0296988 A1* | 12/2009 | Yamazaki et al. ............ 382/103 |
| 2011/0025873 A1 | 2/2011 | Wang et al. | |

FOREIGN PATENT DOCUMENTS

| | | |
|---|---|---|
| JP | 2009-010775 A | 1/2009 |
| WO | WO 2009/080653 A1 | 7/2009 |

* cited by examiner

*Primary Examiner* — Tony N Ngo
(74) *Attorney, Agent, or Firm* — Wolf, Greenfield & Stacks, P.C.

(57) ABSTRACT

An information processing apparatus includes a position detecting section that detects a touch position of a pointing object on a display screen of a display section, a region detecting section that detects a region on the display screen which is hidden by the pointing object, and a control section that displays information associated with the touch position outside the region detected by the region detecting section, when the touch position is detected by the position detecting section.

21 Claims, 21 Drawing Sheets

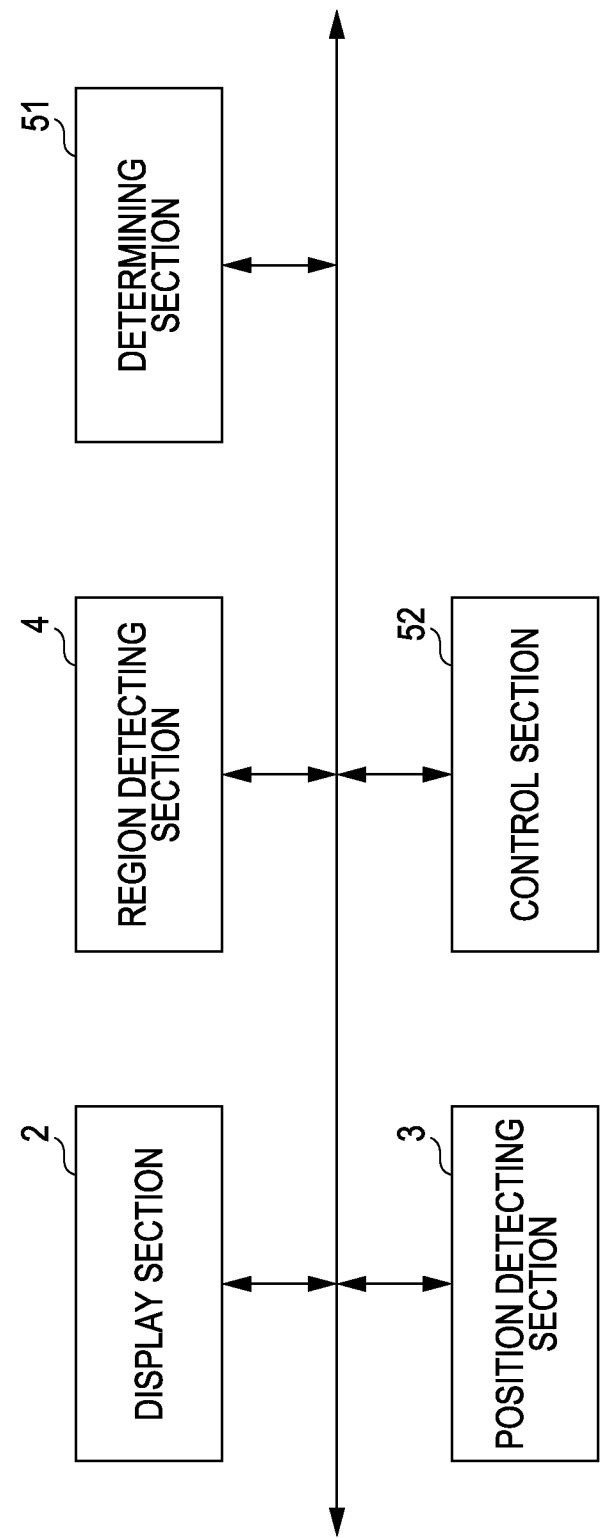

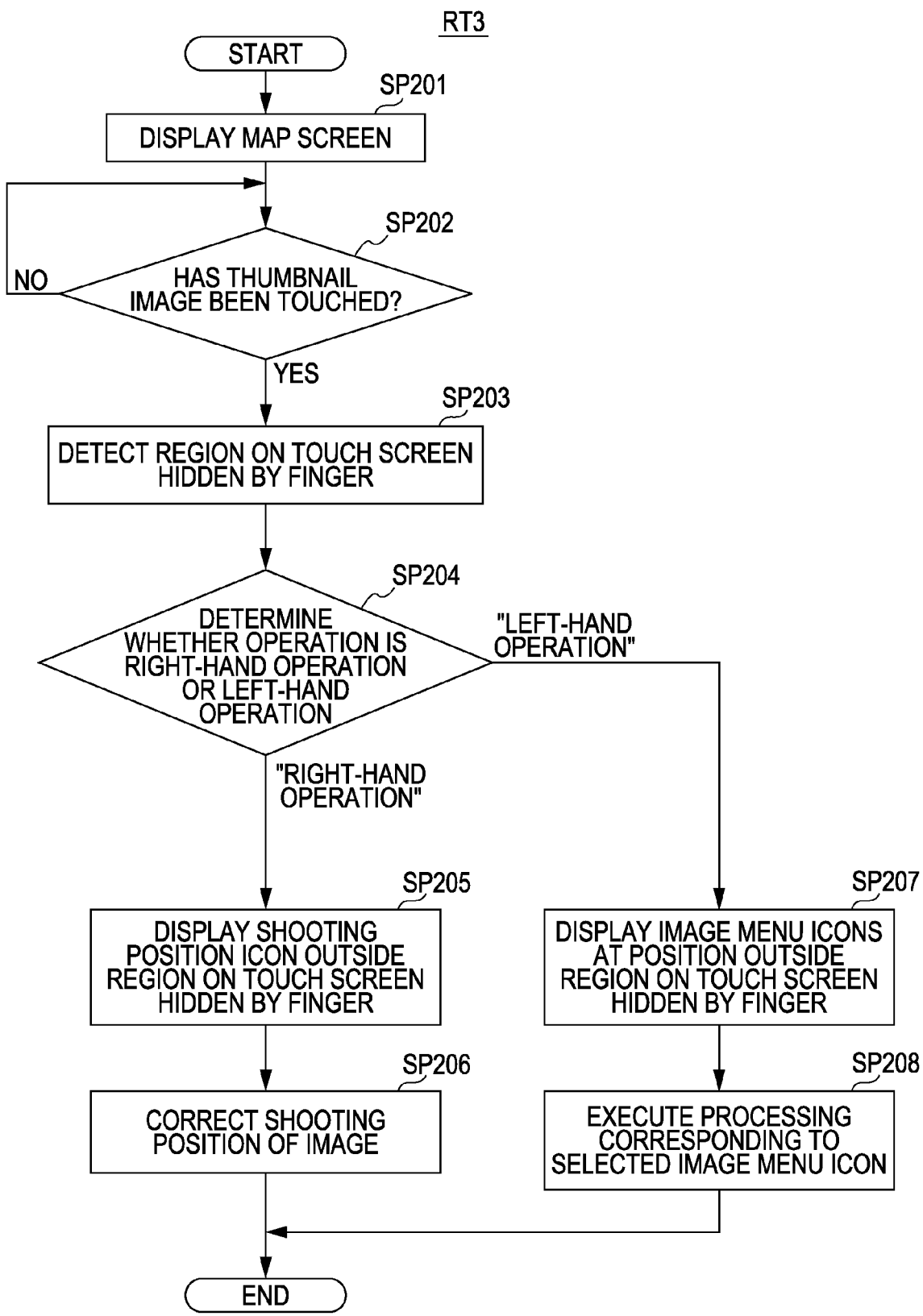

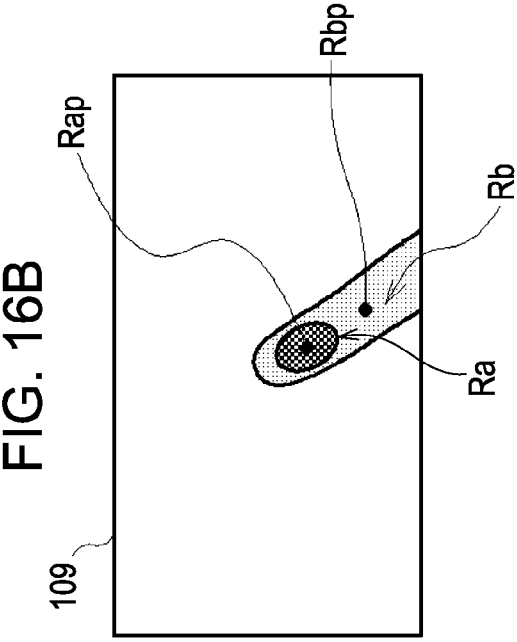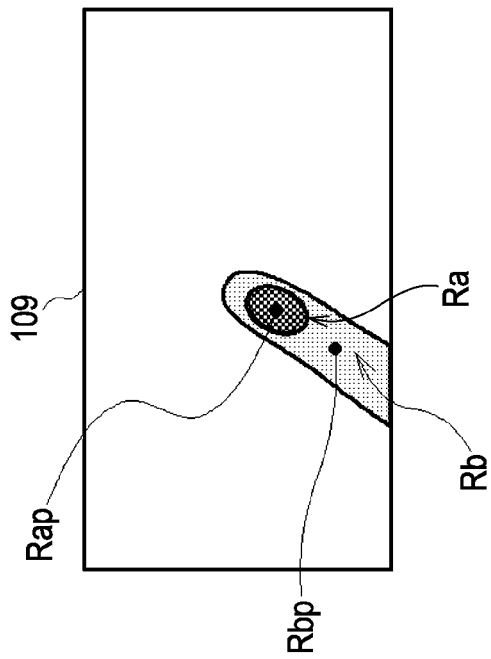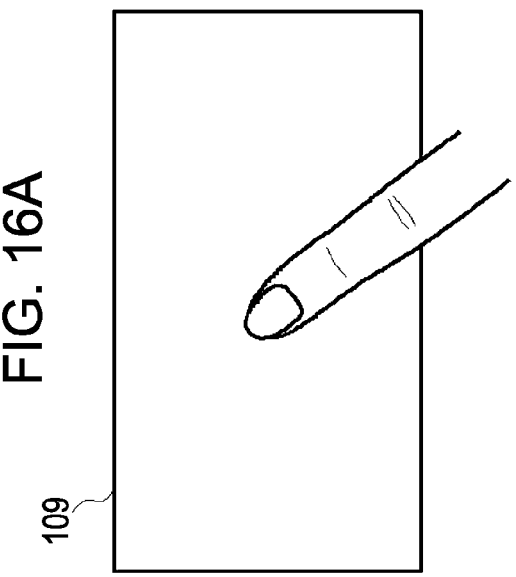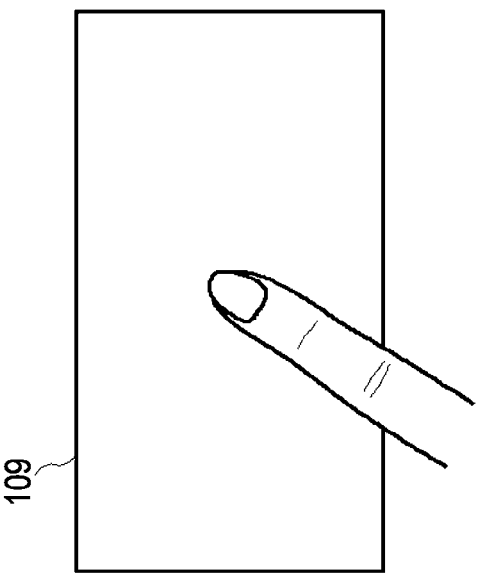

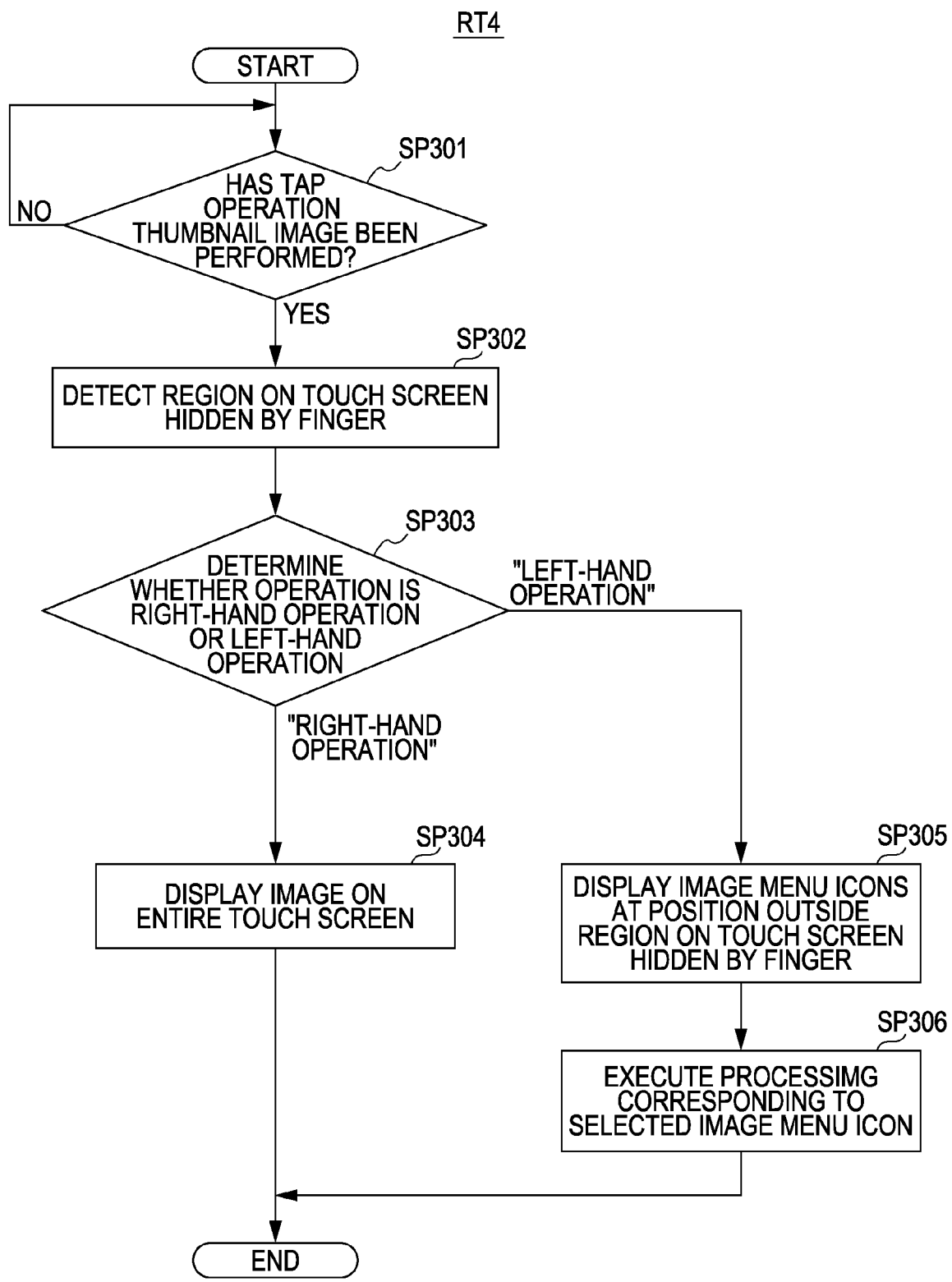

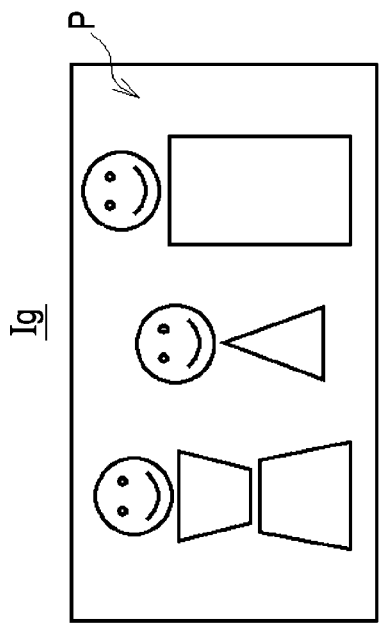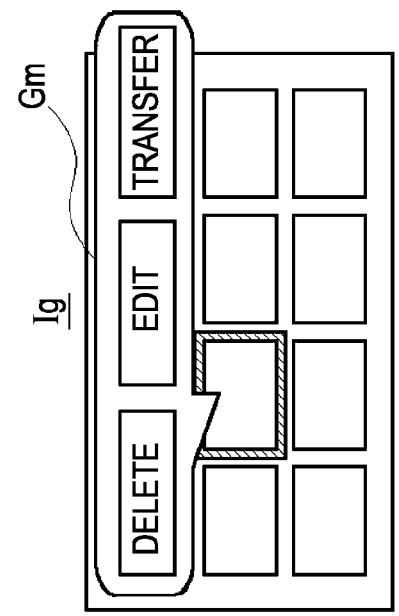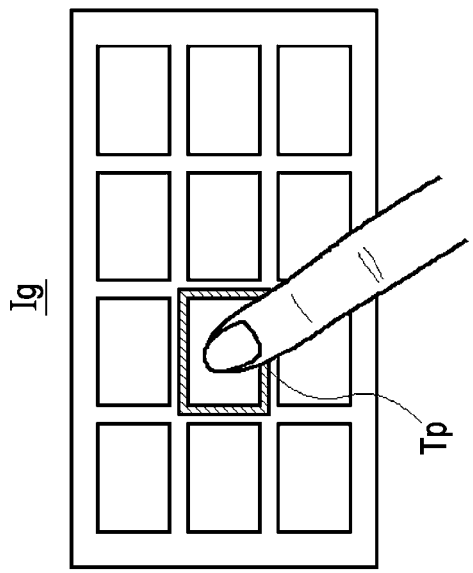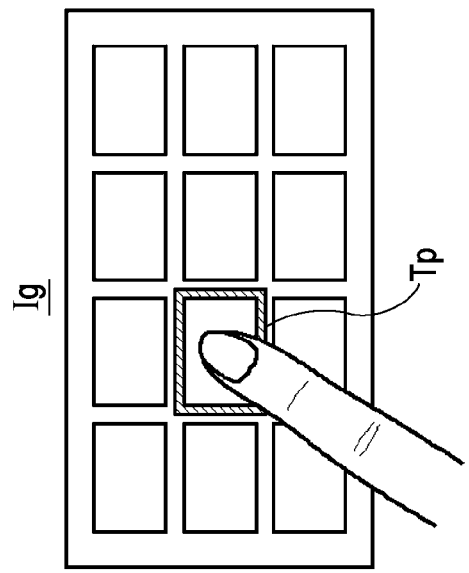
FIG. 20A
FIG. 20B

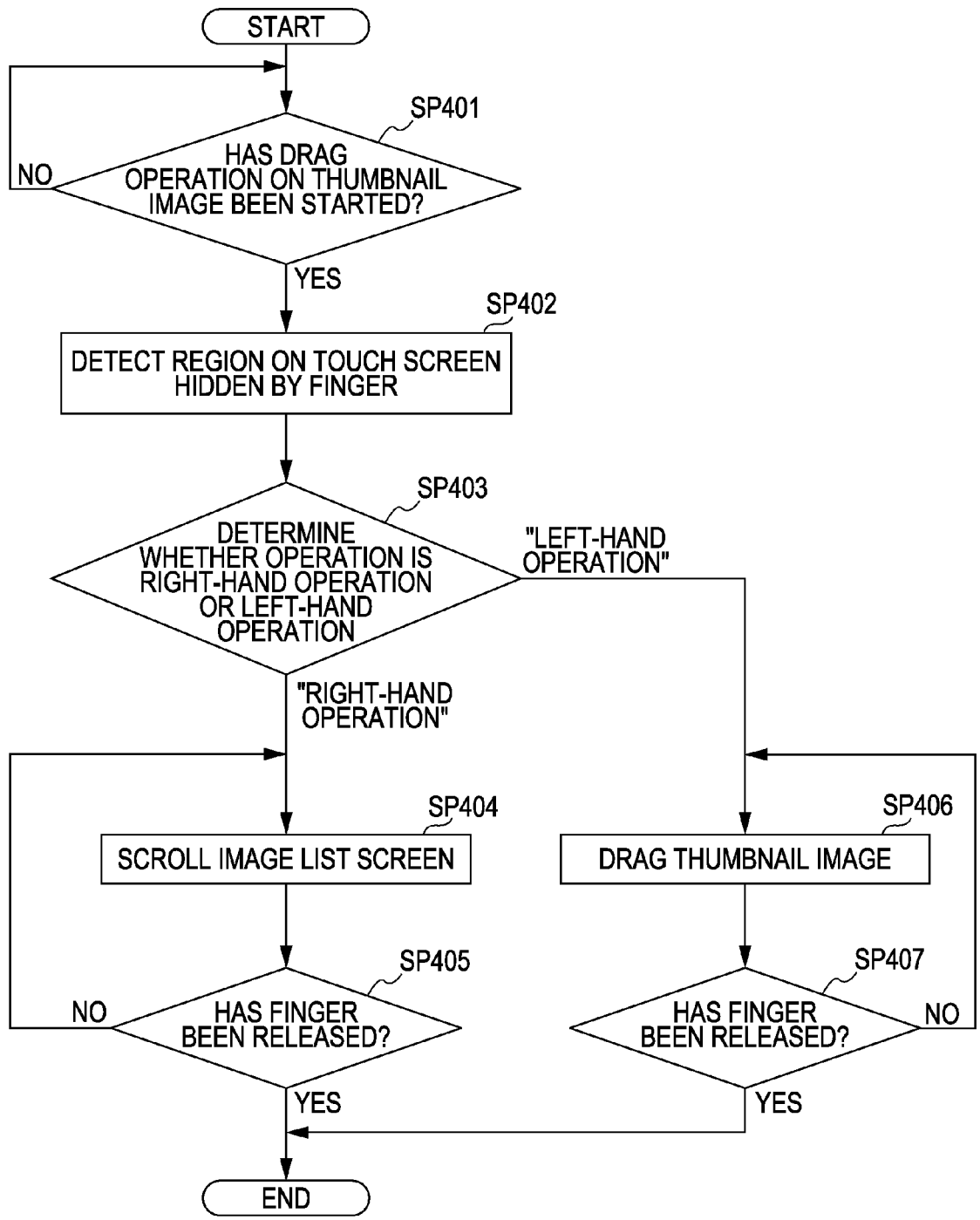

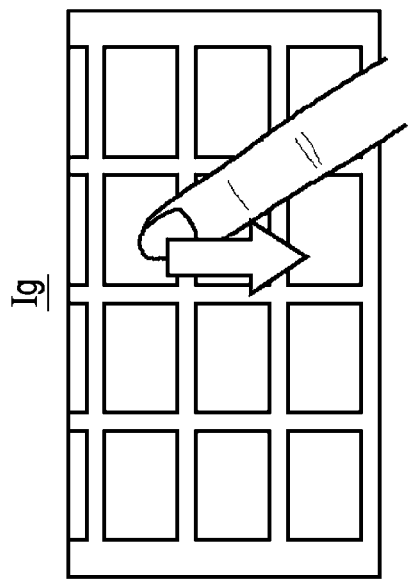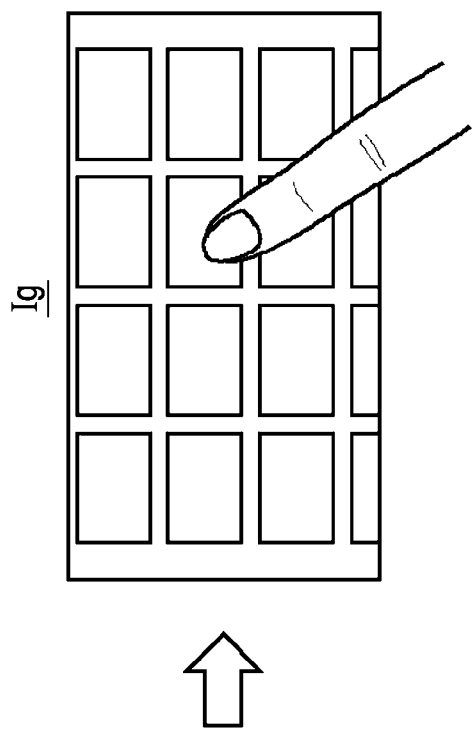
FIG. 22A
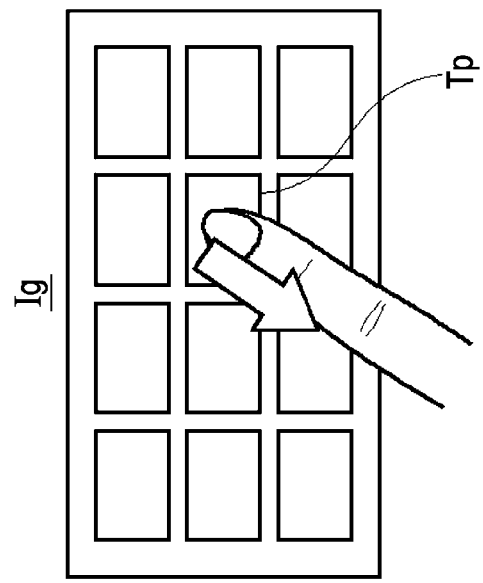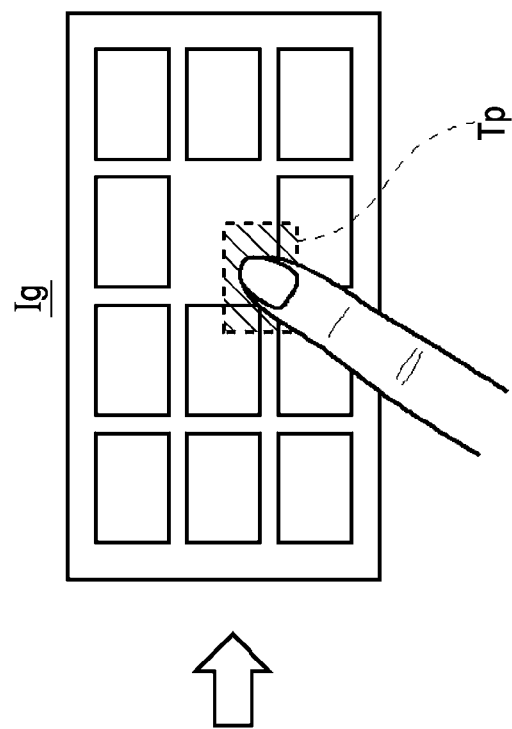
FIG. 22B

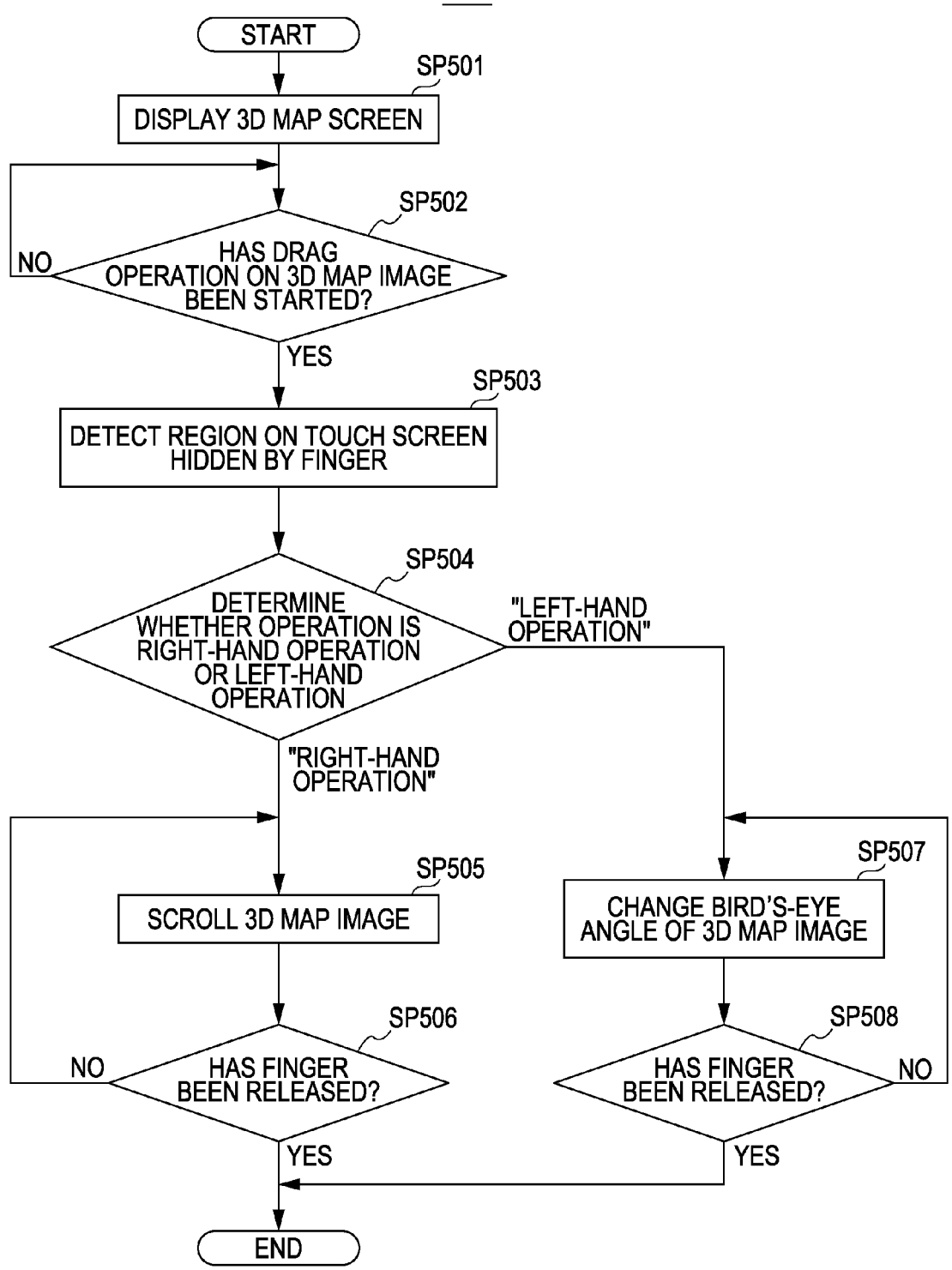

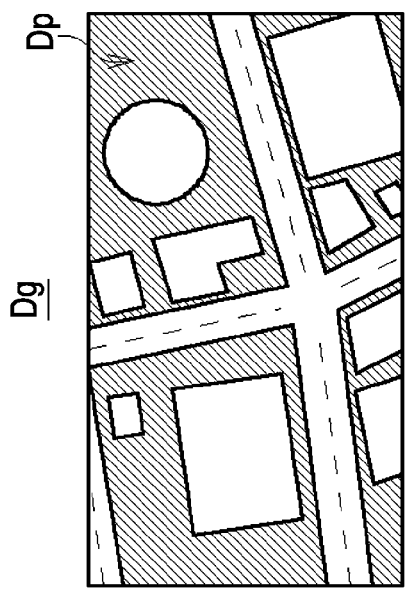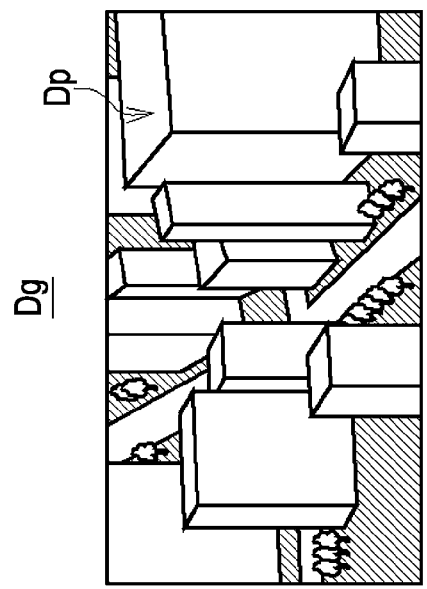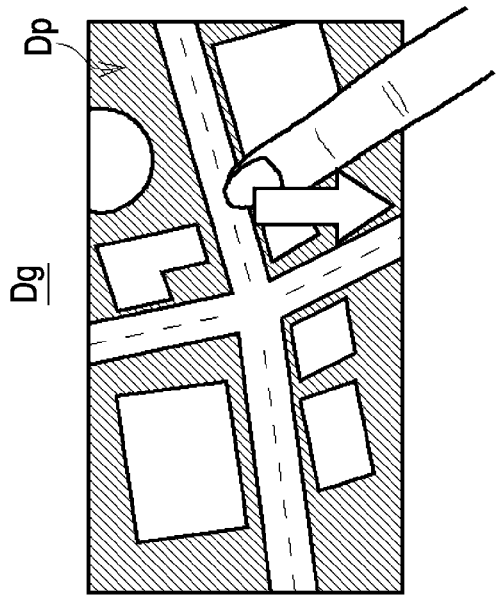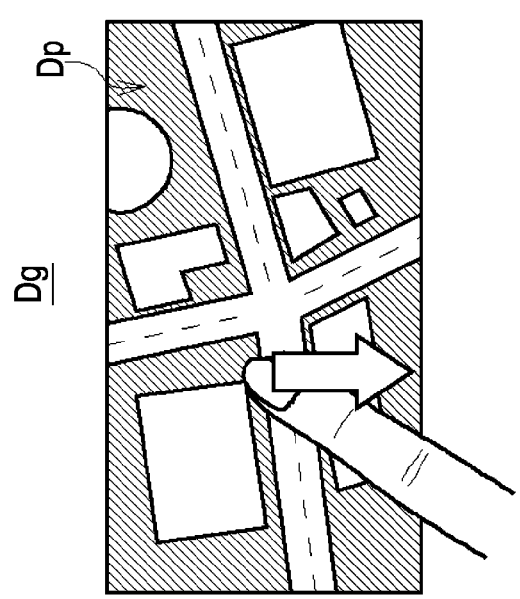
FIG. 24A
FIG. 24B

INFORMATION PROCESSING APPARATUS, DISPLAY METHOD, AND DISPLAY PROGRAM

BACKGROUND OF THE INVENTION

1. Field of the Invention

The present invention relates to an information processing apparatus, a display method, and a display program which are suitable for application to, for example, an information processing apparatus having a touch screen.

2. Description of the Related Art

Recently, a type of information processing apparatus is becoming widely available, which has a touch screen and allows the user to input information by touching the display screen of a display section.

As such an information processing apparatus, for example, there has been proposed a type of information processing apparatus which makes the user select an icon displayed on the display screen by touching the icon (see, for example, Japanese Unexamined Patent Application Publication No. 2009-10775). This information processing apparatus is configured to execute processing according to the selected icon, such as displaying a menu according to the selected icon.

SUMMARY OF THE INVENTION

When the display screen is touched with a pointing object such as a finger in the information processing apparatus described above, a part of the display screen is hidden by the pointing object. Therefore, in cases where, for example, information is displayed in response to a touch on the display screen, if the information is hidden by the pointing object, the user is unable to view the information, making operation difficult for the user.

It is desirable to provide an information processing apparatus, a display method, and a display program which make it possible to further improve operability with a touch screen.

An information processing apparatus according to an embodiment of the present invention includes a position detecting section that detects a touch position of a pointing object on a display screen of a display section, a region detecting section that detects a region on the display screen which is hidden by the pointing object, and a control section that displays information associated with the touch position outside the region detected by the region detecting section, when the touch position is detected by the position detecting section.

According to an embodiment of the present invention, information associated with a touch position can be displayed in such a way that the information is not hidden by a pointing object, thereby allowing the user to view the information with reliability regardless of how the user touches the display screen with the pointing object. Therefore, it is possible to realize an information processing apparatus, a display method, and a display program which can further improve operability with a touch screen.

BRIEF DESCRIPTION OF THE DRAWINGS

FIG. 14 is a functional block diagram showing an overview of a second embodiment;

FIG. 15 is a flowchart showing a map display mode operation procedure according to the second embodiment;

FIGS. 16A and 16B are schematic diagrams used for explaining a right-hand operation;

FIGS. 17A and 17B are schematic diagrams used for explaining a left-hand operation;

FIG. 19 is a flowchart showing a tap operation procedure according to the second embodiment;

FIGS. 20A and 20B are schematic diagrams used for explaining an image list screen according to the second embodiment;

FIG. 21 is a flowchart showing a drag operation procedure according to the second embodiment;

FIGS. 22A and 22B are schematic diagrams used for explaining an image list screen according to the second embodiment;

FIG. 23 is a flowchart showing a 3D map image operation procedure according to the second embodiment;

FIGS. 24A and 24B are schematic diagrams used for explaining a 3D map screen according to the second embodiment.

DESCRIPTION OF THE PREFERRED EMBODIMENTS

The best modes for carrying out the present invention (hereinafter, referred to as embodiments) will be described below. The description will be given in the following order of topics.

1. First Embodiment
2. Second Embodiment
3. Other Embodiments

1. First Embodiment

1-1. Overview of First Embodiment

First, an overview of a first embodiment will be described. After describing this overview, the description will move on to a specific example of this embodiment.

Figure 1:
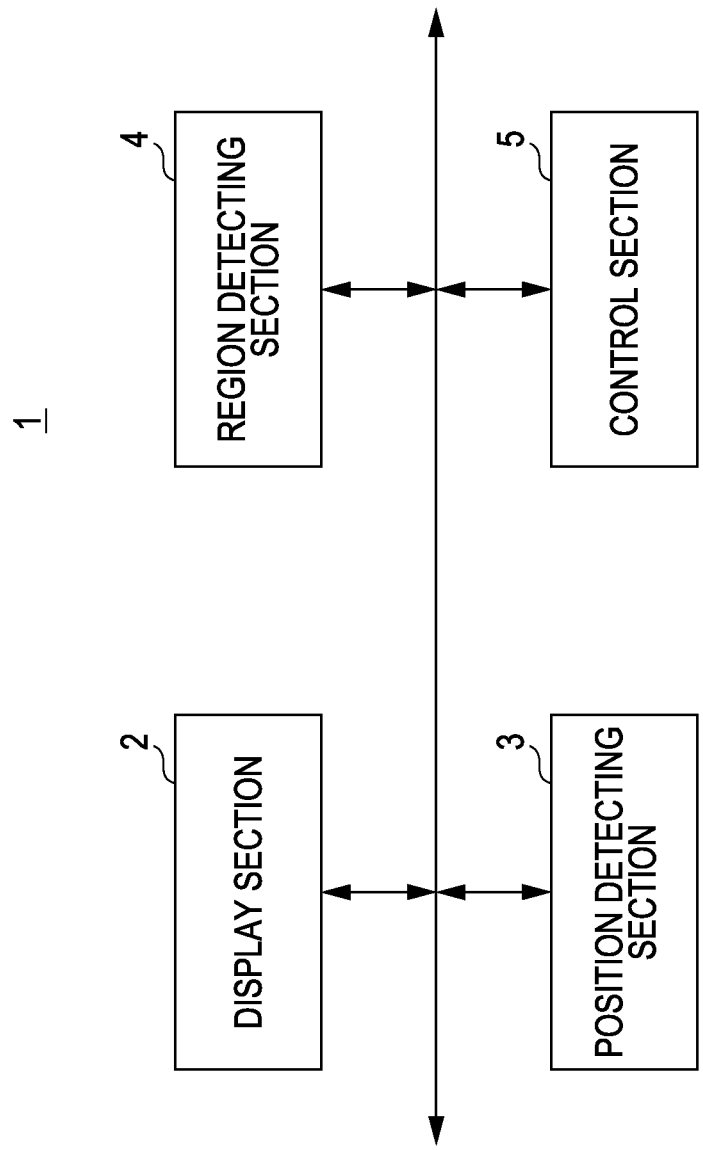
FIG. 1 is a functional block diagram showing an overview of a first embodiment.

In FIG. 1, reference numeral 1 denotes an information processing apparatus. The information processing apparatus 1 has a position detecting section 3 that detects a touch position of a pointing object on the display screen of a display section 2. The information processing apparatus 1 also has a region detecting section 4 that detects a region hidden by the pointing object on the display screen of the display section 2.

Further, the information processing apparatus 1 has a control section 5 configured to display information associated with a touch position when the touch position is detected by the position detecting section 3, outside the region detected by the region detecting section 4.

According to this configuration, the information processing apparatus 1 can display information associated with a touch position in such a way that the information is not hidden by a pointing object, thereby allowing the user to view the information with reliability regardless of how the user touches the display screen with the pointing object.

A specific example of the information processing apparatus 1 configured as described above will be described in detail below.

1-2. Exterior Configuration of DSC (Digital Still Camera)

Figure 2A:
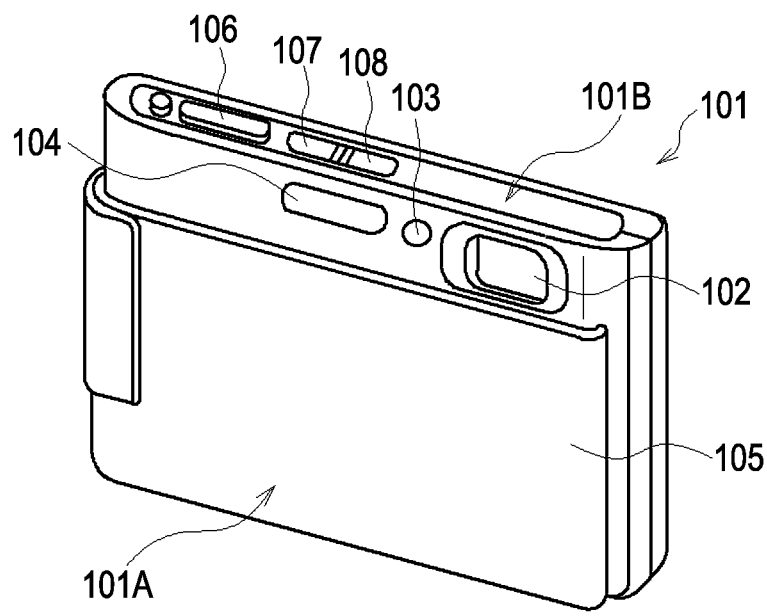
FIGS. 2A and 2B are schematic diagrams showing the exterior configuration of a DSC (digital still camera)
Figure 2B:
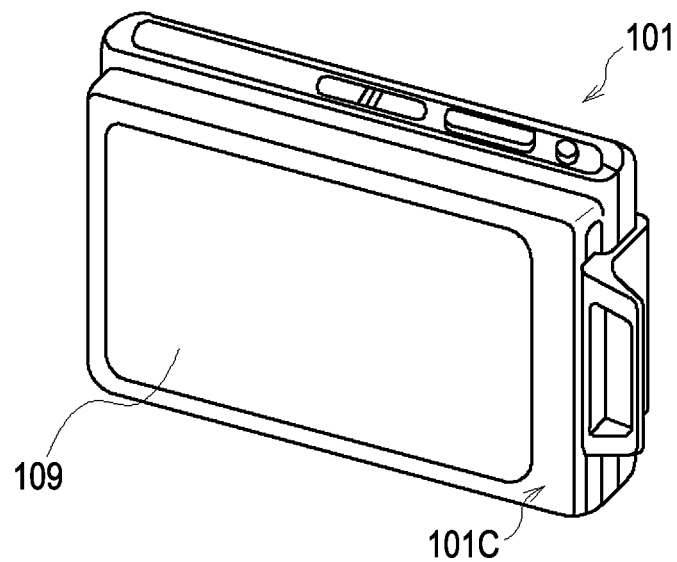

Next, referring to FIGS. 2A and 2B, a description will be given of the exterior configuration of a digital still camera (hereinafter, also referred to as DSC) 100 representing a specific example of the information processing apparatus 1 described above.

The DSC 100 has a casing 101 with a substantially flat rectangular shape of such a size that allows it to be held in one hand. A taking lens 102, an AF (Auto Focus) illuminator 103, and a flash 104 are provided in an upper part of a front surface 101A of the casing 101. The AF illuminator 103 doubles as a self-timer lamp.

Further, a lens cover 105 that can slide up and down is attached to the front surface 101A. Sliding the lens cover 105 downwards causes the taking lens 102, the AF illuminator 103, and the flash 104 to be exposed, while sliding the lens cover 105 upwards causes these components to be covered for protection.

It should be noted that the DSC 100 is also configured to automatically turn on by sliding the lens cover 105 downwards.

A shutter button 106, a playback button 107, and a power button 108 are provided on an upper surface 101B of the casing 101. Further, a touch screen 109 is provided on a back surface 101C of the casing 101.

The playback button 107 is a hardware key for switching the operation mode of the DSC 100 to a playback mode for displaying a shot image on the touch screen 109. The touch screen 109 is a display device that allows a touch operation with a user's finger.

Upon sliding the lens cover 105 downwards, or depressing the power button 108, the DSC 100 turns on and activates in a shooting mode.

Then, the DSC 100 displays an image taken via the taking lens 102 on the touch screen 109 as a monitoring image. Then, the DSC 100 records the image when the shutter button 106 is depressed.

The DSC 100 changes to the playback mode when the playback button 107 is depressed. Then, the DSC 100 displays, for example, one of recorded images on the touch screen 109. Then, the DSC 100 switches images to be displayed, in accordance with a touch operation on the touch screen 109.

1-3. Hardware Configuration of DSC (Digital Still Camera)

Figure 3:
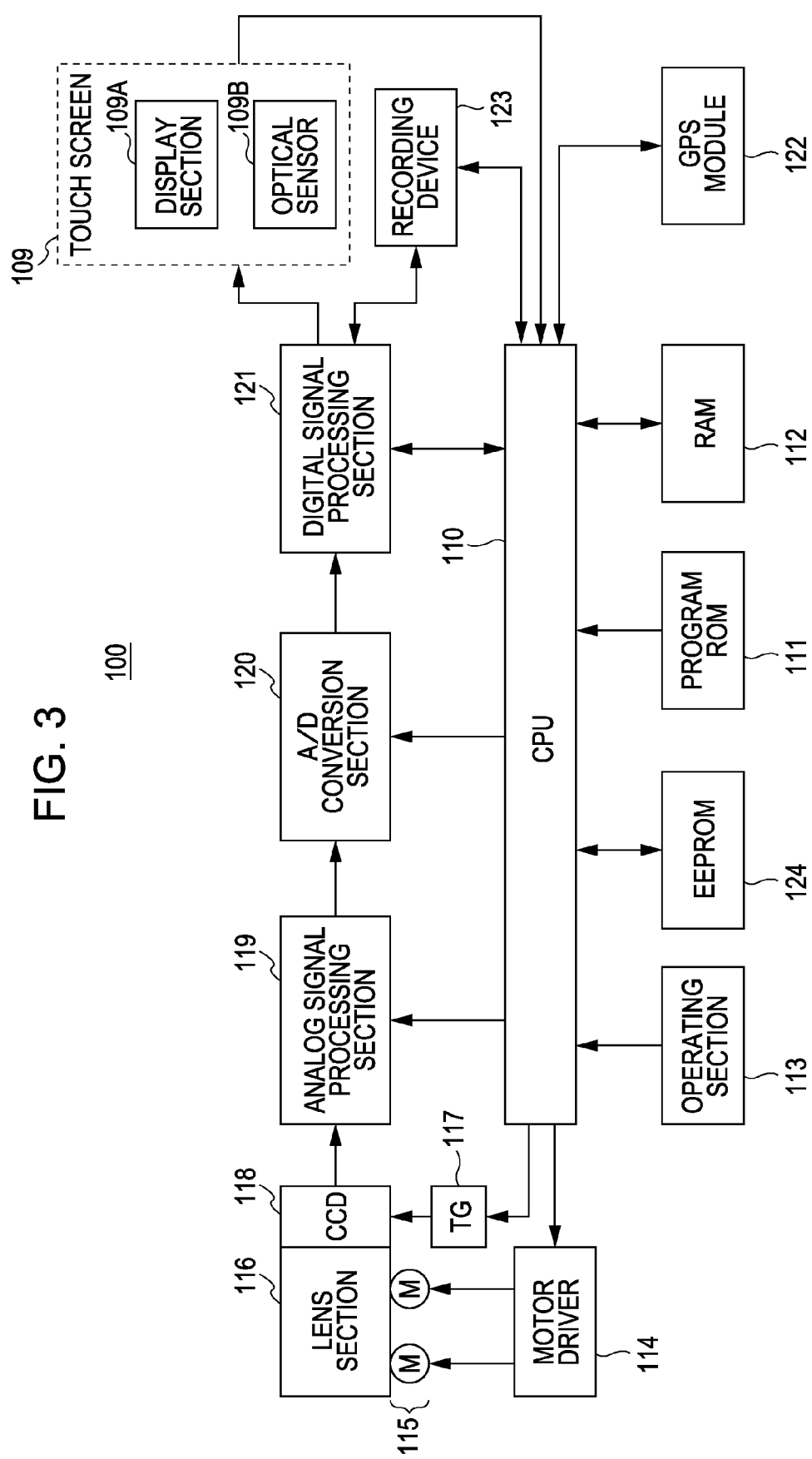
FIG. 3 is a block diagram showing the hardware configuration of a DSC (digital still camera)

Next, referring to FIG. 3, the hardware configuration of the DSC 100 will be described. In the DSC 100, a CPU 110 is configured to execute various kinds of processing by loading a program written in a ROM 111 into a RAM 112 and executing the program, and control individual sections in accordance with signals from the touch screen 109 and an operating section 113. Incidentally, the term CPU is an abbreviation of Central Processing Unit. In addition, the term ROM is an abbreviation of Read Only Memory, and the term RAM is an abbreviation of Random Access Memory.

The touch screen 109 is an optical sensor type touch screen. A plurality of pixel sets are arranged in, for example, a matrix form on the display screen of the touch screen 109 in a matrix form. Each pixel set includes light emitting devices respectively corresponding to red display, green display, and blue display as a display section 109A, and an optical sensor 109B.

The optical sensor 109B receives light incident on the display screen of the touch screen 109 from the outside, and generates, at every predetermined time interval, a signal according to the optical intensity of the received light and its position on the touch screen 109 of the optical sensor 109B. The optical sensor 109B is configured to send the signal to the CPU 110.

Figure 4A:
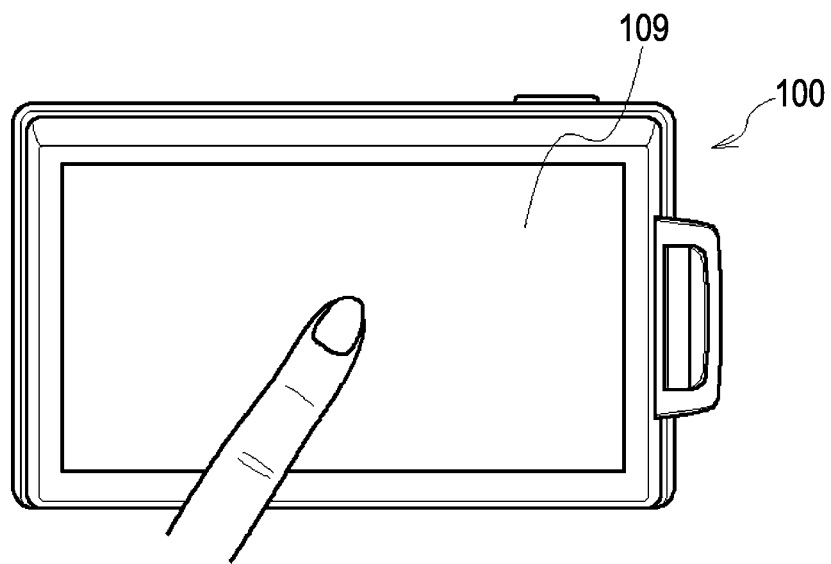
FIGS. 4A and 4B are schematic diagrams used for explaining detection of a region on a touch screen which is hidden by a finger.

For example, suppose that, as shown in FIG. 4A, a user's finger is in contact with the display screen of the touch screen 109. In this case, it is considered that the fingertip is in contact with the display screen of the touch screen 109, and the portion other than the fingertip is not in contact with but in proximity to the display screen.

At this time, in the region on the display screen of the touch screen 109 which is in contact with the user's finger, light incident on the display screen is blocked by the user's finger, so the optical intensity of light received by the optical sensor 109B becomes small.

In the region on the display screen of the touch screen 109 which is in proximity to the user's finger, a shadow is cast by the user's finger. Thus, the optical intensity of light received by the optical sensor 109B becomes somewhat small but is larger than that in the region in contact with the finger.

On the other hand, in the region on the display screen of the touch screen 109 which is neither in contact with nor in proximity to the user's finger, light incident on the display screen is not blocked. Thus, the optical intensity of light received by the optical sensor 109B is larger than that in the region in contact with or in proximity to the finger.

Figure 4B:
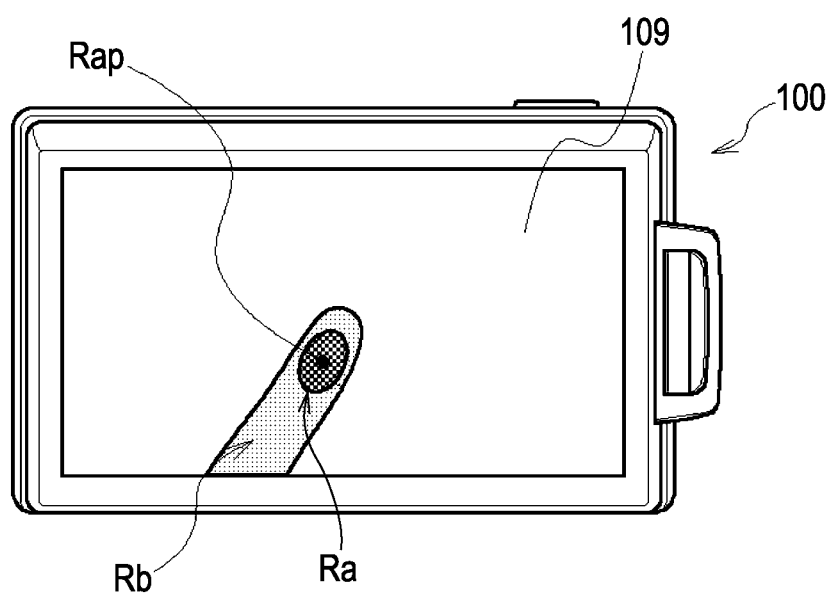

In view of this, as shown in FIG. 4B, the CPU 110 detects a region in which the optical intensity of light received by the optical sensor 109B is smaller than a predetermined threshold (this will be also referred to as first threshold), and recognizes this region as a region Ra that is in contact with the finger.

Then, the CPU 110 detects the center of gravity of the region Ra in contact with the finger as coordinates on the display screen of the touch screen 109, and recognizes the coordinates as a position Rap contacted by the user' finger (i.e., a touch position).

By sequentially recognizing the touch position Rap on the basis of a signal sent from the optical sensor 109B at every predetermined time interval, the CPU 110 recognizes how the touch position Rap has moved (i.e., the trajectory of the touch position Rap).

Then, on the basis of the touch position Rap and its trajectory recognized in this way, the CPU 110 is configured to determine what kind of touch operation has been made to which position on the screen.

Also, the CPU 110 detects a region in which the optical intensity of light received by the optical sensor 109B is smaller than a predetermined threshold (this will be also referred to as second threshold) larger than the first threshold and is larger than the first threshold, and recognizes this region as a region Rb that is in proximity to the finger.

Then, the CPU 110 recognizes each of the region Ra in contact with the finger and the region Rb in proximity to the finger as being a region hidden by the user's finger, and displays information associated with the touch position Rap outside this region. That is, the CPU 110 is configured to display information associated with the touch position Rap in such a way that the information is not hidden by the user's finger.

With regard to the process of displaying information associated with the touch position Rap outside the region on the touch screen 109 hidden by the finger, a detailed description will be given with reference to an image menu display procedure and a shooting position correction procedure described later.

The operating section 113 (FIG. 3) is a device including the shutter button 106, the playback button 107, and the power button 108 described above. The operating section 113 sends a signal according to an operation on each of these buttons to the CPU 110.

On the basis of the signal sent from the operating section 113, the CPU 110 determines which one of the shutter button 106, the playback button 107, and the power button 108 has been operated.

In actuality, the CPU 110 operates in the shooting mode upon turning on when the power button 108 of the operating button 113 is depressed, or upon being instructed through a touch operation on the touch screen 109 to switch the operating mode to the shooting mode.

At this time, the CPU 110 controls a motor driver 114 to drive an actuator 115, thereby exposing a lens section 116 including the taking lens 102, the AF illuminator 103, and the like described above from the casing 101 of the DSC 110. By driving the actuator 115, the CPU 110 also adjusts the aperture of the lens section 116, changes the zoom ratio of an optical zoom, or moves a focus lens.

At this time, the CPU 110 controls a timing generator (TG) 117 to supply a timing signal to an imaging device 118 made of a CCD (Charge Coupled Device) or the like. By operating on the basis of this timing signal, the imaging device 118 converts light from a subject captured via the lens section 16 into an electric signal (i.e., performs photoelectric conversion), and sends the electric signal to an analog signal processing section 119.

Under control of the CPU 110, the analog signal processing section 119 applies analog signal processing (such as amplification) to this electric signal to obtain an analog image signal, and sends this analog image signal to an analog/digital conversion section (this will be also referred to as A/D conversion section) 120.

Under control of the CPU 110, the A/D conversion section 120 performs analog/digital conversion (A/D conversion) on the sent analog image signal to obtain a digital image signal, and sends this digital image signal to a digital signal processing section 121.

Under control of the CPU 110, the digital signal processing section 121 applies digital signal processing (such as noise removal) to the digital image signal sent from the A/D conversion section 120, and then sends the resulting signal to the display section 109A of the touch screen 109. As a result, a subject's image is displayed as a monitoring image on the touch screen 109. In this way, the DSC 100 makes the photographer check the subject.

At this time, under control of the CPU 110, the digital signal processing section 121 generates graphics signals for buttons, icons, and the like, and superimposes the graphics signals on the digital image signal. As a result, buttons, icons, and the like are displayed on the touch screen 109 together with the monitoring image.

Now, suppose that the shutter button 106 of the operating section 113 is depressed. Then, the CPU 110 records an image in response to this operation.

At this time, under control of the CPU 110, the digital signal processing section 121 compresses a digital image signal sent from the A/D conversion section 120 in a compression/decompression format such as JPEG to generate compressed image data, and sends the compressed image data to the CPU 110. Incidentally, the term JPEG is an abbreviation of Joint Photographic Experts Group.

At this time, under control of the CPU 110, the digital signal processing section 121 also generates thumbnail image data obtained by shrinking an image based on the digital image signal, and sends the thumbnail image data to the CPU 110.

Under the control of the CPU 110, a GPS module 122 receives signals from a plurality of GPS satellites, and measures the current position (latitude, longitude, and the like) of the DSC 100 on the basis of the signals. Then, the GPS module 122 sends this current position, that is, shooting position information indicating the position at the time of shooting, to the CPU 110.

The CPU 110 also acquires the current date and time (i.e., the date and time of shooting) from a timing section (not shown) such as a timer.

Then, the CPU 110 generates an image file by adding the thumbnail image data, the shooting position information, the date and time of shooting, and the like to the compressed image data that has been sent.

Then, the CPU 110 records this image file onto a recording device 123. In this way, the CPU 110 records an image.

Incidentally, the recording device 123 is, for example, a non-volatile memory with a capacity of about several gigabytes to several tens gigabytes. The recording device 123 may be a recording medium built in the DSC 100 in advance, or may be a recording medium that can be inserted in and removed from the DSC 100, such as a memory card.

The DSC 100 also has an EEPROM (Electrically Erasable Programmable ROM) 124, separately from the recording device 123. The CPU 110 is configured to store information that is to be retained even after the power is turned off, such as various kinds of information set by the user, on the EEPROM 124. As a recording medium on which to store such information, for example, a flash memory may be used instead of the EEPROM 124.

On the other hand, when the playback button 108 of the operating section 113 is depressed, or when it is instructed through a touch operation on the touch screen 109 to switch the operating mode to the playback mode, the CPU 110 operates in the playback mode.

The DSC 100 has the following modes as types of the playback mode: a normal display mode that displays an image one by one; a list display mode that displays a list of a plurality of images; and a map display mode that displays an image on a map image corresponding to a shooting position.

When the normal display mode is selected via the touch screen 109, the CPU 110 reads one of images files recorded on the recording device 123 (for example, the image file with the latest shooting date and time). Then, the CPU 110 extracts compressed image data from this image file, and sends the compressed image data to the digital signal processing section 121.

Under control of the CPU 110, the digital signal processing section 121 decompresses the sent compressed image data to obtain the original, pre-compressed digital image signal, and sends the digital image signal to the display section 109A. As a result, a played back image is displayed on the touch screen 109.

When the image list display mode is selected via the touch screen 109, the CPU 110 reads a plurality of image files (for example, a plurality of image files in order of the latest shooting date and time) recorded on the recording device 123. Then, the CPU 110 extracts thumbnail image data from these image files, and sends the thumbnail image data to the digital signal processing section 121.

Figure 5:
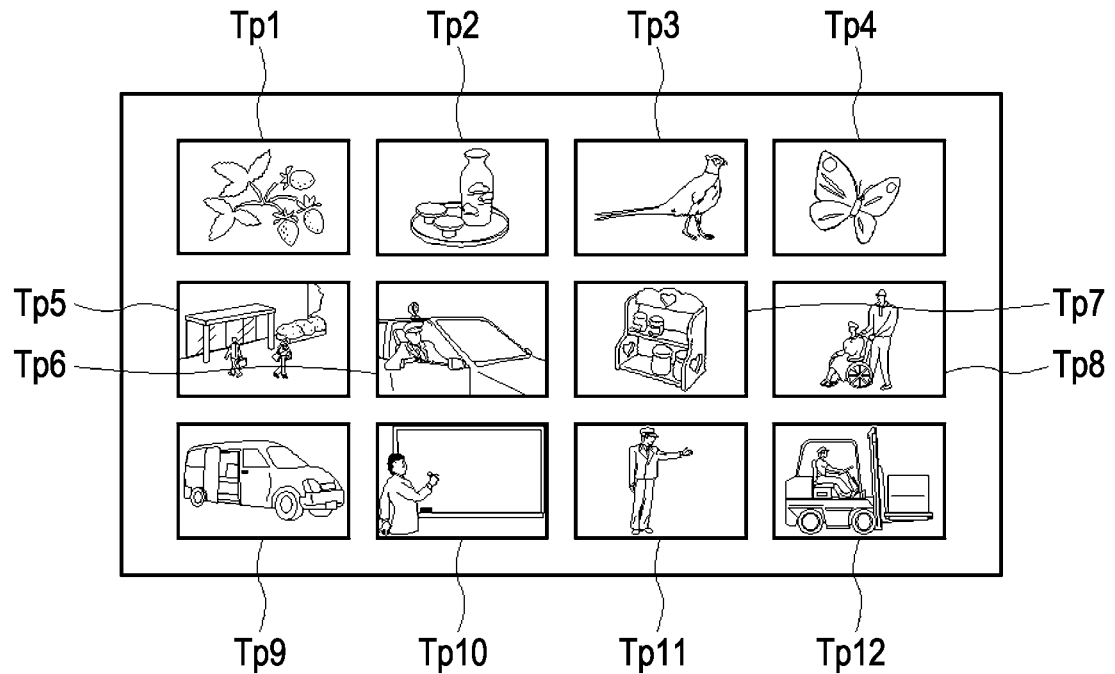
FIG. 5 is a schematic diagram used for explaining an image list screen according to the first embodiment.

Under control of the CPU 110, the digital signal processing section 121 generates a screen display signal that serves as an image list screen on the basis of the sent thumbnail image data, and sends the screen display signal to the display section 109A. As a result, as shown in FIG. 5, an image list screen Ig on which thumbnail images Tp (Tp1, Tp2, . . . , Tpn) based on the thumbnail image data are arranged in a matrix form, for example, is displayed on the touch screen 109.

When the map display mode is selected via the touch screen 109, the CPU 110 reads an image file (for example, an image file with the latest shooting date and time) recorded on the recording device 123.

Then, the CPU 110 extracts thumbnail image data from this image file, and sends the thumbnail image data to the digital signal processing section 121. At the same time, the CPU 110 extracts shooting position information from this image file, reads map image data on the vicinity including the shooting position from the recording device 123, and sends the map image data to the digital signal processing section 121.

Under control of the CPU 110, the digital signal processing section 121 generates a screen display signal that serves as a map screen on the basis of the thumbnail image data and the map image data that have been sent, and sends this screen display signal to the display section 109A.

Figure 6:
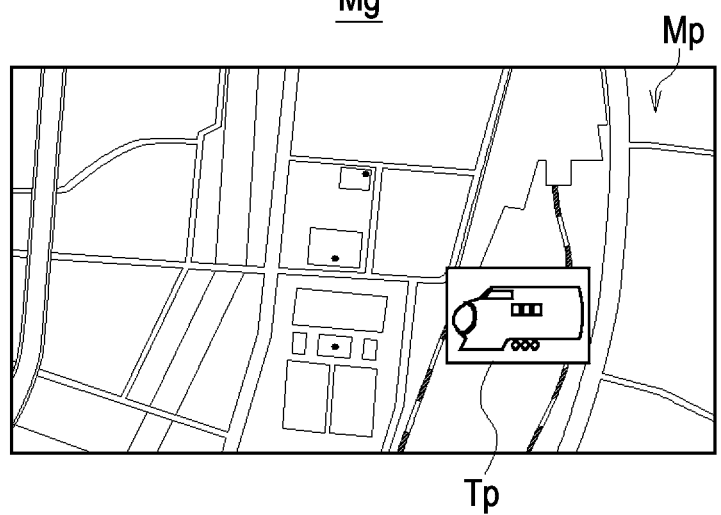
FIG. 6 is a schematic diagram used for explaining a map screen according to the first embodiment.

As a result, as shown in FIG. 6, a map screen Mg is displayed on the touch screen 109. On the map screen Mg, a thumbnail image Tp based on the thumbnail image data is arranged at a position corresponding to the shooting position on a map image Mp based on the map image data.

Under control of the CPU 110, the digital signal processing section 121 also generates graphics signals for buttons, icons, and the like, and superimposes the graphics signals on the digital image signal. As a result, on the touch screen 109, buttons, icons, and the like are displayed on the image list screen Ig or the map screen Mg.

In this way, the CPU 110 plays back an image.

It should be noted that the touch screen 109 of the DSC 100 is the hardware corresponding to the display section 2 of the information processing apparatus 1 described above. Also, the CPU 110 of the DSC 100 is the hardware corresponding to the control section 5 of the information processing apparatus 1 described above. Further, the touch screen 109 and CPU 110 of the DSC 100 are the hardware corresponding to the position detecting section 3 and region detecting section 4 of the information processing apparatus 1 described above. In the DSC 100, the touch screen 109 and the CPU 110 act in cooperation with each other to implement functions equivalent to the position detecting section 3 and region detecting section 4 of the information processing apparatus 1.

1-4. Image Menu Display Procedure

When in the image list display mode, the DSC 100 is configured to display menus for various kinds of processing that can be performed on an image in accordance with a user operation, such as delete, edit, and transfer. Hereinbelow, an operating procedure for displaying the menus for various kinds of processing that can be performed on an image (this will be also referred to as image menu display procedure) will be described with reference to the flowchart shown in FIG. 7.

Incidentally, this image menu display procedure RT1 is a procedure that is executed by the CPU 110 of the DSC 100 in accordance with a program written in the program ROM 111.

When the image list display mode is selected via the touch screen 109, the CPU 110 starts this image menu display procedure RT1, and transfers to step SP1.

In step SP1, the CPU 110 displays on the touch screen 109 the image list screen Ig (FIG. 5) that displays a list of thumbnail images Tp of a plurality of images as described above, and transfers to the next step SP2.

In step SP2, the CPU 110 determines whether or not an operation of touching a point on an arbitrary thumbnail image Tp and depressing the point for a predetermined time or more (i.e., a long-press operation on the thumbnail image Tp) has been performed.

It should be noted that upon recognizing that the touch position Rap has not moved for a predetermined time or more on an arbitrary thumbnail image Tp via the touch screen 109 as described above, the CPU 110 recognizes that a long-press operation on the thumbnail image Tp has been performed.

If a negative result is obtained in this step SP2 because a long-press operation has not been performed on an arbitrary thumbnail image Tp, the CPU 110 returns to step SP2 again, and waits on standby until a long-press operation on an arbitrary thumbnail image Tp is performed.

On the other hand, if a positive result is obtained in step SP2 because a long-press operation has been performed on an arbitrary thumbnail image Tp, the CPU 110 recognizes that the image indicated by the arbitrary thumbnail image Tp has been selected, and transfers to the next step SP3.

In step SP3, the CPU 110 detects a region on the touch screen 109 which is hidden by a finger, via the touch screen 109 as described above, and transfers to step SP4.

Figure 8A:
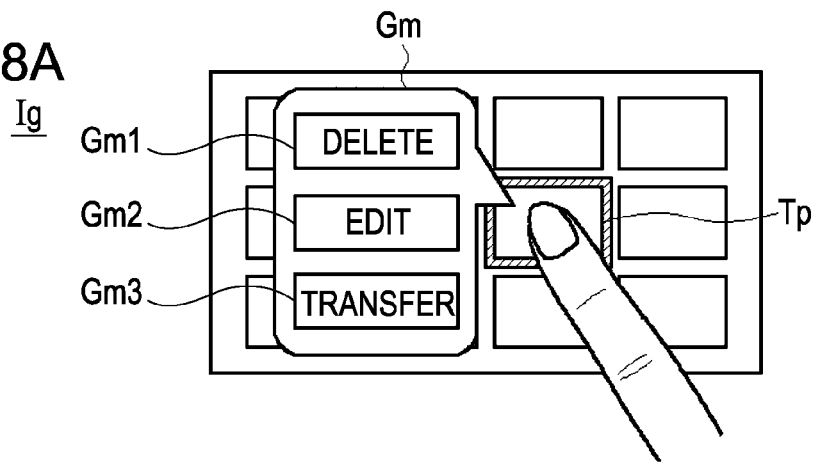
FIGS. 8A to 8D are schematic diagrams used for explaining an image list screen according to the first embodiment.
Figure 8B:
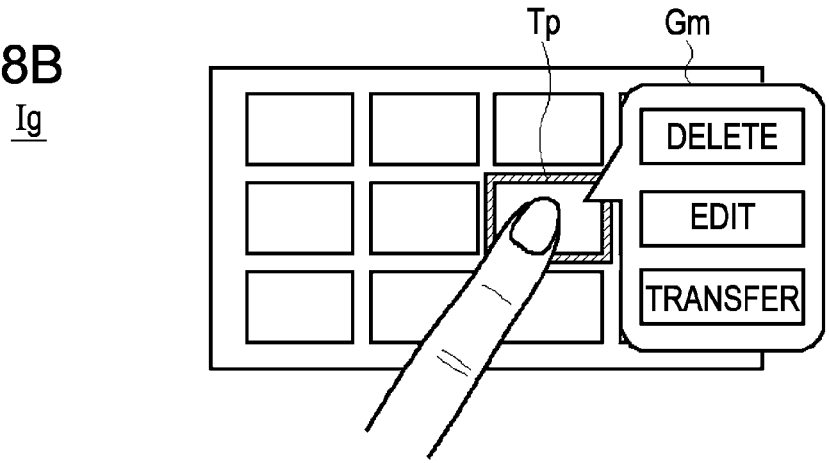
Figure 8C:
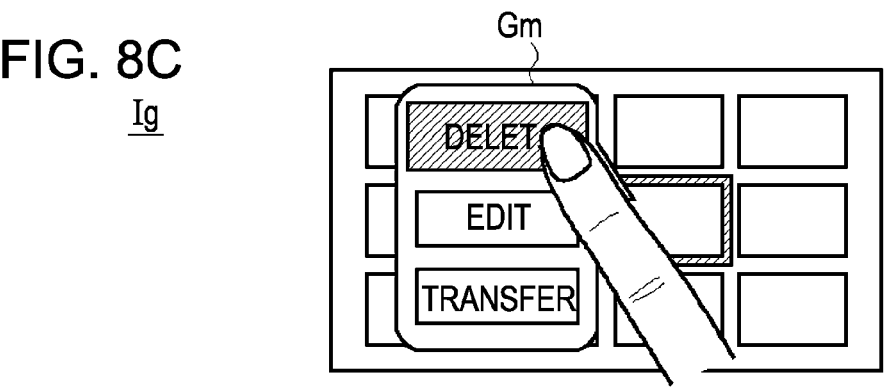

In step SP4, as shown in FIGS. 8A to 8C, the CPU 110 displays, on the image list screen Ig, image menu icons Gm indicating menus for various kinds of processing that can be performed on an image.

Specifically, the image menu icons Gm are displayed in, for example, a vertically elongated pop-up form. The image menu icons Gm include a Delete menu icon Gm1, an Edit menu icon Gm2, and a Transfer menu icon Gm3 which are provided in a vertical line from the top in the stated order. The Delete menu icon Gm1 indicates deleting of a selected image, the Edit menu icon Gm2 indicates editing of a selected image, and the Transfer menu icon Gm3 indicates transferring of a selected image to external equipment.

At this time, the CPU 110 is configured to display the image menu icons Gm in a way that does not overlap a region hidden by the finger on the touch screen 109, at a position on either the right side or left side of the thumbnail image Tp on which a long-press operation is being performed.

For example, when a finger is touching a thumbnail image Tp from the lower right side as shown in FIG. 8A, the lower right part of the thumbnail image Tp and the lower right side of the thumbnail image Tp are the region hidden by the finger. At this time, if the image menu icons Gm are displayed on the right side of the thumbnail image Tp so as to be adjacent to the thumbnail image Tp, the part of the image menu icons Gm which lies within this region is hidden by the finger.

In this case, the CPU 110 displays the image menu icons Gm adjacent to the thumbnail image Tp, at a position on the left side of the thumbnail image Tp which does not overlap the region hidden by the finger.

On the other hand, when a finger is touching a thumbnail image Tp from the lower left side as shown in FIG. 8B, the lower left part of the thumbnail image Tp and the lower left side of the thumbnail image Tp are the region hidden by the finger. At this time, if the image menu icons Gm are displayed on the left side of the thumbnail image Tp so as to be adjacent to the thumbnail image Tp, the part of the image menu icons Gm which lies within this region is hidden by the finger.

In this case, the CPU 110 displays the image menu icons Gm adjacent to the thumbnail image Tp, at a position on the right side of the thumbnail image Tp which does not overlap the region hidden by the finger.

Figure 7:
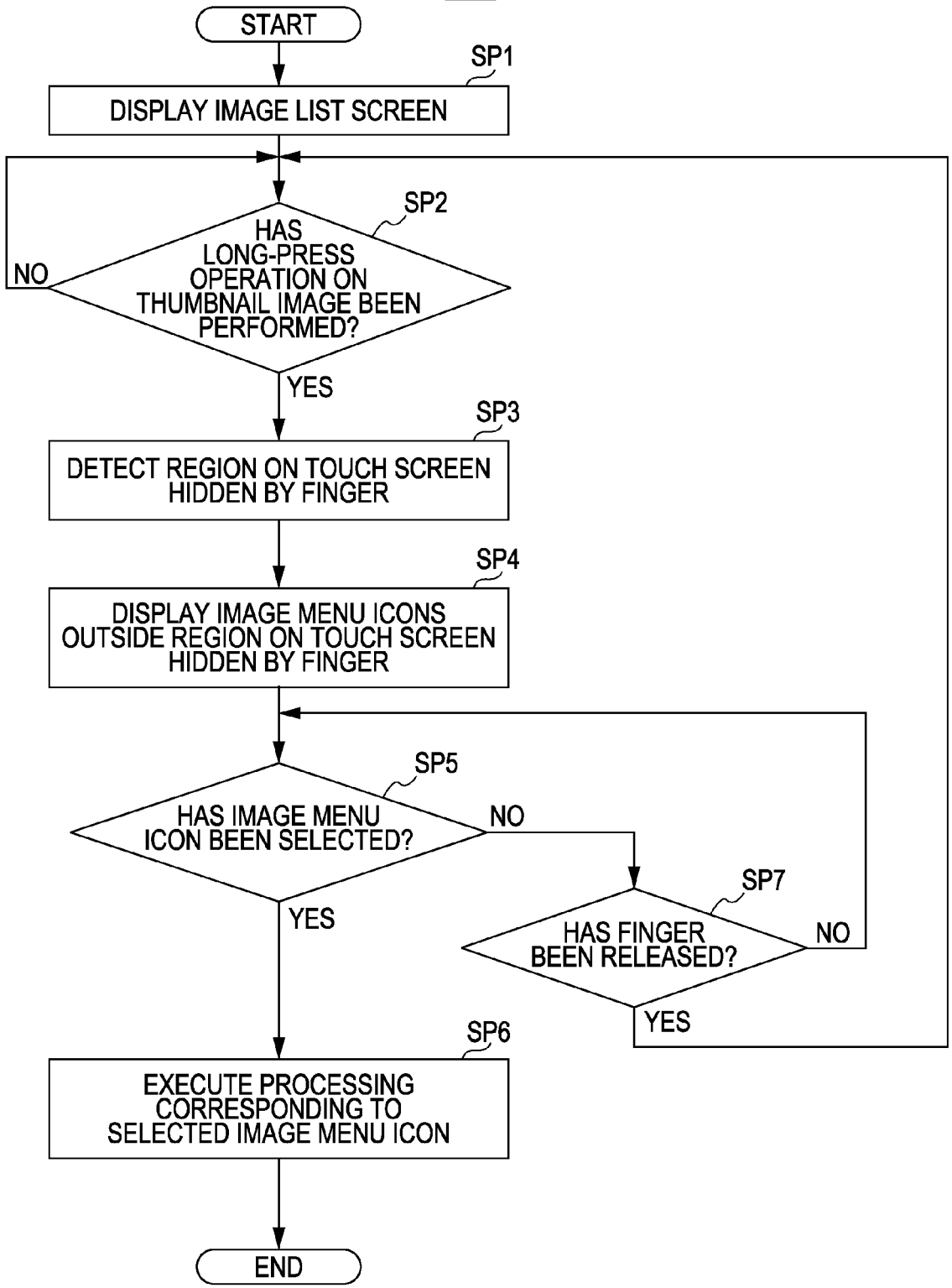
FIG. 7 is a flowchart showing an image menu display procedure according to the first embodiment.

In this way, the CPU 110 displays the image menu icon Gm outside the region on the touch screen 109 which is hidden by the finger, and transfers to the next step SP5 (FIG. 7).

In step SP5, the CPU 110 determines whether or not any one of the Delete menu icon Gm1, Edit menu icon Gm2, and Transfer menu icon Gm3 of the image menu icons Gm has been selected. Specifically, when the finger is moved to the position on any one of these image menu icons Gm while touching the touch screen 109 and then the finger is released, the image menu icon Gm at the position where the finger is released is recognized as having been selected.

If a positive result is obtained in this step SP5, the CPU 110 transfers to the next step SP6.

In step SP6, with respect to a selected image, the CPU 110 executes processing corresponding to the selected image menu icon Gm.

Figure 8D:
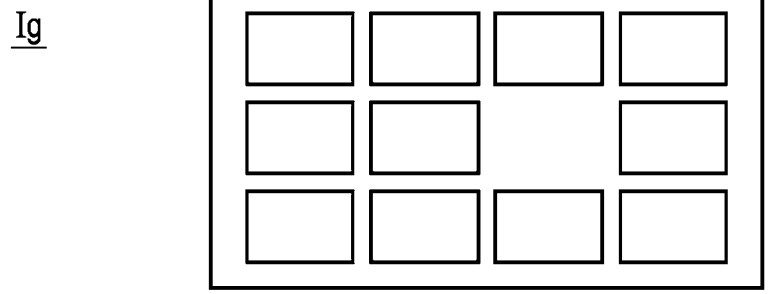

For example, as shown in FIG. 8C, when the Delete menu icon Gm1 is selected, the CPU 110 deletes an image file corresponding to the selected image from the recording device 123. At the same time, as shown in FIG. 8D, the CPU 110 deletes display of the thumbnail image Tp of the selected image.

When the Edit menu icon Gm2 is selected, the CPU 110 displays an Edit screen (not shown) for editing the selected image. This Edit screen allows the user to change the saturation of an image to generate a monochromatic or sepia toned image, or generate an image that has been changed in brightness or hue.

When the Transfer menu icon Gm3 is selected, the CPU 110 transfers the selected image to USB equipment (such as a printer) connected via, for example, a USB (Universal Serial Bus) terminal (not shown) of the DSC 100.

Upon executing processing corresponding to the selected image menu icon Gm with respect to the selected image in this way, the CPU 110 ends the image menu display procedure RT1 (FIG. 7).

On the other hand, if a negative result is obtained in step SP5 because none of the Delete menu icon Gm1, the Edit menu icon Gm2, and the Transfer menu icon Gm3 has been selected, the CPU 110 transfers to step SP7.

In step SP7, the CPU 110 determines whether or not the finger has been released from the touch screen 109.

If a negative result is obtained in this step SP7, the CPU 110 returns to step SP5. Then, the CPU 110 determines again whether or not any one of the Delete menu icon Gm1, the Edit menu icon Gm2, and the Transfer menu icon Gm3 of the image menu icons Gm has been selected.

On the other hand, if a positive result is obtained in step SP7, the CPU 110 recognizes that the image has been deselected, and makes the image menu icons Gm invisible and returns to step SP2. Then, the CPU 110 again waits on standby until a long-press operation on a thumbnail image Tp is performed.

Through the above-mentioned image menu display procedure RT1, the DSC 100 is configured to display each image menu icon Gm, and perform various kinds of processing on an image in accordance with a touch operation on the image menu icon Gm.

1-5. Shooting Position Correction Procedure

A situation is conceivable in which at the time of shooting an image, the GPS module 122 of the DSC 100 measures an erroneous shooting position due to the influence of an obstacle, noise, or the like. Accordingly, the DSC 100 is configured so that when in the map display mode, the shooting position of an image can be corrected in accordance with a user operation. Hereinbelow, an operating procedure for performing this process of correcting the shooting position of an image (this will be also referred to as shooting position correction procedure) will be described with reference to the flowchart shown in FIG. 9.

Incidentally, this shooting position correction procedure RT2 is also a procedure that is executed by the CPU 110 of the DSC 100 in accordance with a program written in the program ROM 111.

When the map display mode is selected via the touch screen 109, the CPU 110 starts this shooting position correction procedure RT2, and transfers to step SP101.

In step SP101, the CPU 110 displays, on the touch screen 109, the map screen Mg (FIG. 6) in which the thumbnail image Tp of an image is arranged at a position on the map image Mp corresponding to the shooting position as described above, and transfers to the next step SP102.

In step SP102, the CPU 110 determines whether or not an operation of touching a point on the thumbnail image Tp with a finger and moving the finger while keeping the finger in touch (i.e., a drag operation on the thumbnail image Tp) has been started.

Specifically, the CPU 110 determines that a drag operation on the thumbnail image Tp has been started, upon recognizing that the touch position Rap on the thumbnail image Tp has moved by a predetermined distance or more via the touch screen 109.

If a negative result is obtained in this step SP102 because a drag operation on the thumbnail image Tp has not been started, the CPU 110 returns to step SP102 again, and waits on standby until a drag operation on the thumbnail image Tp is performed.

On the other hand, if a positive result is obtained in step SP102 because a drag operation on the thumbnail image Tp has been started, the CPU 110 transfers to the next step SP103.

In step SP103, the CPU 110 detects a region on the touch screen 109 which is hidden by a finger, via the touch screen 109 as described above, and transfers to step SP104.

In step SP104, the CPU 110 displays a shooting position icon Si at a position adjacent to the thumbnail image Tp and outside the region on the touch screen 109 hidden by the finger.

This shooting position icon Si indicates a position that serves as a new shooting position, and is configured to move together with the thumbnail image Tp during a drag operation on the thumbnail image Tp.

While a drag operation on the thumbnail image Tp is performed, the thumbnail image Tp is hidden by the finger, making it difficult for the user to check at which position on the map image Mp the thumbnail image Tp is located. Accordingly, by displaying the shooting position icon Si adjacent to the thumbnail image Tp during a drag operation, the user is notified of which position is about to be selected as a new shooting position.

Figure 10:
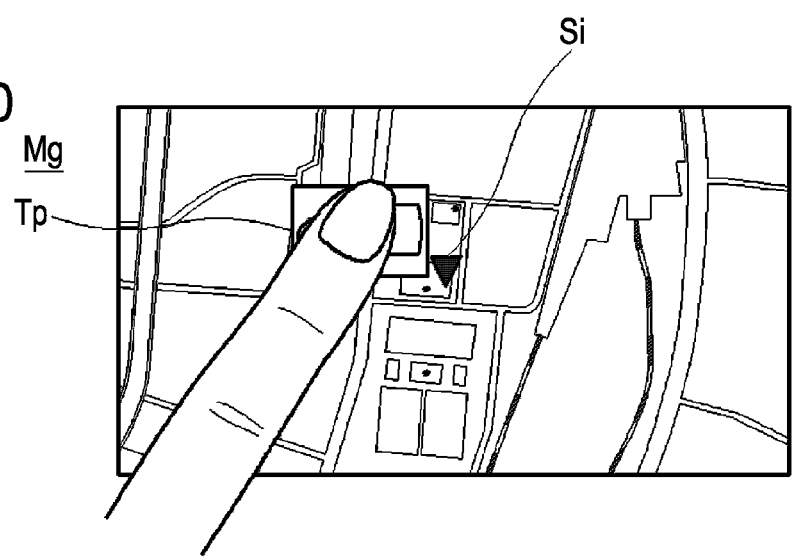
FIG. 10 is a schematic diagram used for explaining a map screen according to the first embodiment.

For example, as shown in FIG. 10, when the lower left part of the thumbnail image Tp and the lower left side of the thumbnail image Tp are the region hidden by the finger, the shooting position icon Si is displayed, for example, near the lower right corner of the thumbnail image Tp.

Then, the CPU 110 moves the thumbnail image Tp in accordance with the drag operation on the thumbnail image Tp. At the same time, the CPU 110 moves the shooting position icon Si in such a way that the shooting position icon Si is present near the lower right corner of the thumbnail image Tp at all times. That is, the CPU 110 moves the shooting position icon Si in accordance with the movement of the thumbnail image Tp so that its position relative to the thumbnail image Tp does not change.

Figure 11:
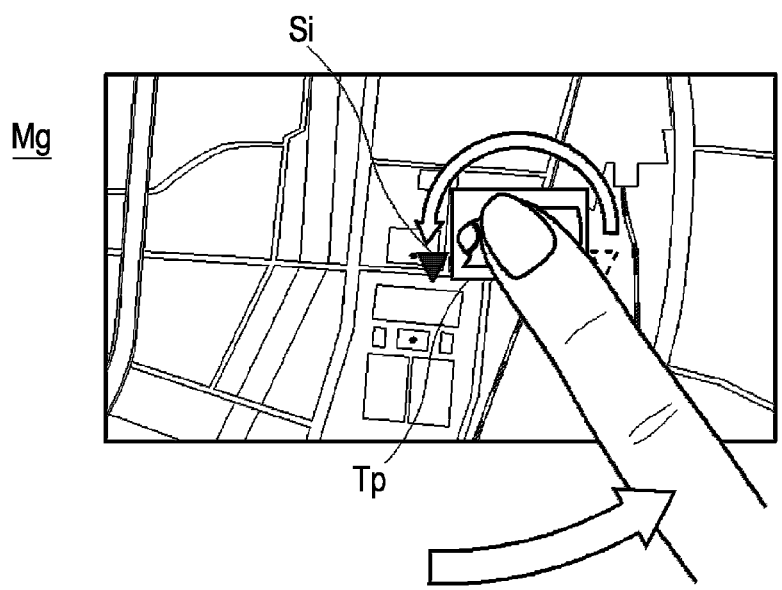
FIG. 11 is a schematic diagram used for explaining a map screen according to the first embodiment.

Now, suppose that the tilt of the finger with respect to the touch screen 109 has changed during a drag operation on the thumbnail image Tp so that as shown in, for example, FIG. 11, the lower right part of the thumbnail image Tp and the lower right side of the thumbnail image Tp become the region hidden by the finger. At this time, if the shooting position icon Si remains displayed near the lower right corner of the thumbnail image Tp, the shooting position icon Si is hidden by the finger.

When the CPU 110 determines that the display position of the shooting position icon Si that has been moved lies within the region hidden by the finger as described above, the CPU 110 moves the display position of the shooting position icon Si to a position outside the region hidden by the finger, for example, near the lower left corner.

Figure 12:
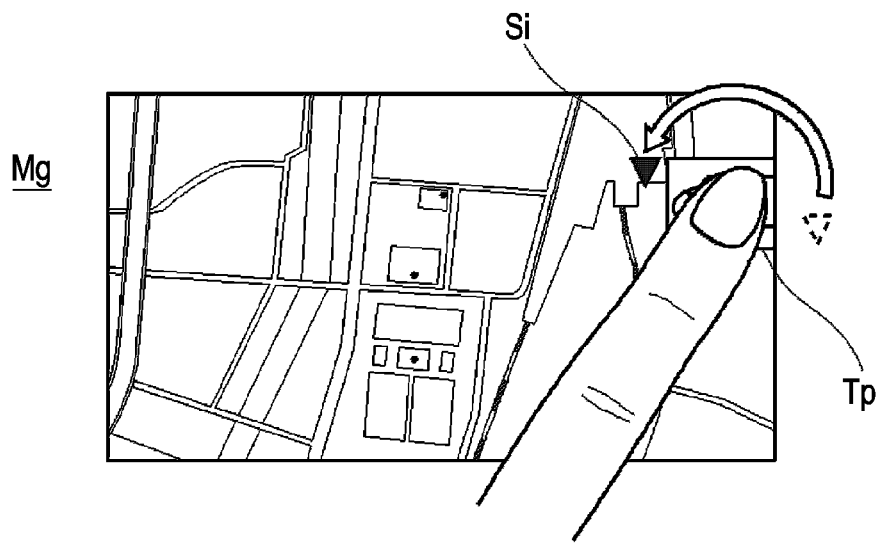
FIG. 12 is a schematic diagram used for explaining a map screen according to the first embodiment.

Also, suppose that during a drag operation on the thumbnail image Tp, the thumbnail image Tp has moved to the right end of the map screen Mg as shown in FIG. 12.

At this time, if the shooting position icon Si remains displayed at a position near the lower right corner of the thumbnail image Tp, then the position lies outside the map screen Mg, so the shooting position icon Si can be no longer displayed.

When the CPU 110 determines that the display position of the shooting position icon Si that has been moved lies outside the map screen Mg as described above, the CPU 110 moves the display position of the shooting position icon Si to a position inside the map screen Mg and outside the region hidden by the finger, for example, near the upper left corner.

Figure 9:
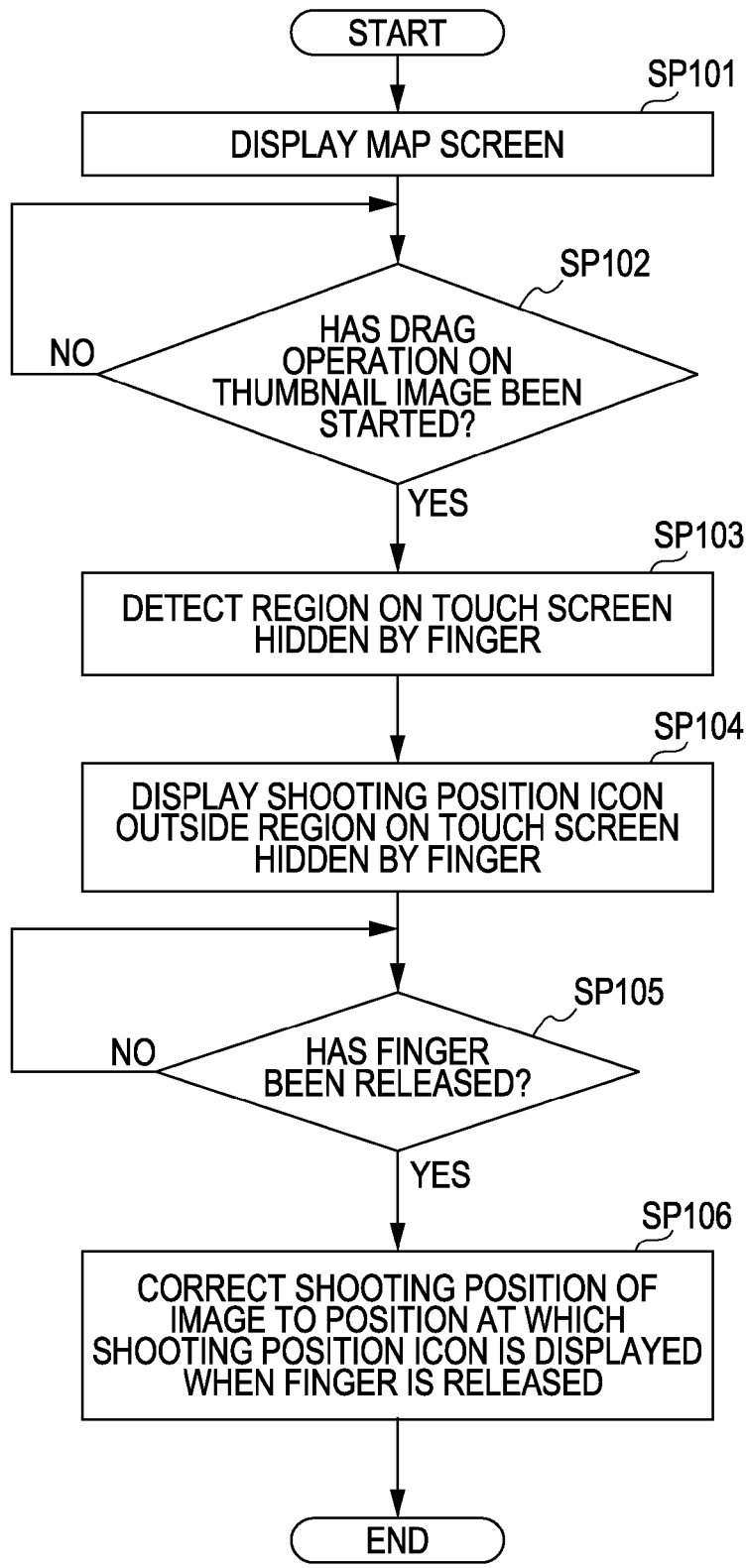
FIG. 9 is a flowchart showing a shooting position correction procedure according to the first embodiment.

In this way, the CPU 110 displays the shooting position icon Si at a position adjacent to the thumbnail image Tp and outside the region on the touch screen 109 hidden by the finger, at all times. Then, the CPU 110 moves to the next step SP105 (FIG. 9).

In step SP105, the CPU 110 determines whether or not the user's finger has been released from the touch screen 109.

If a negative result is obtained in this step SP105 because the user's finger has not been released from the touch screen 109, this means that the drag operation on the thumbnail image Tp is being continued. At this time, the CPU 110 returns to step SP105 again, and waits on standby until the user's finger is released from the touch screen 109.

On the other hand, if a positive result is obtained in step SP105 because the user's finger has been released from the touch screen 109, this means that the drag operation on the thumbnail image Tp has finished. At this time, the CPU 110 transfers to step SP106.

In step SP106, the CPU 110 corrects the shooting position of an image indicated by the thumbnail image Tp to the position at which the shooting position icon Si is located on the map image Mp when the user's finger is released from the touch screen 109. That is, the CPU 110 updates shooting position information written in the metadata of an image file with the shooting position information indicating the corrected shooting position.

Figure 13A:
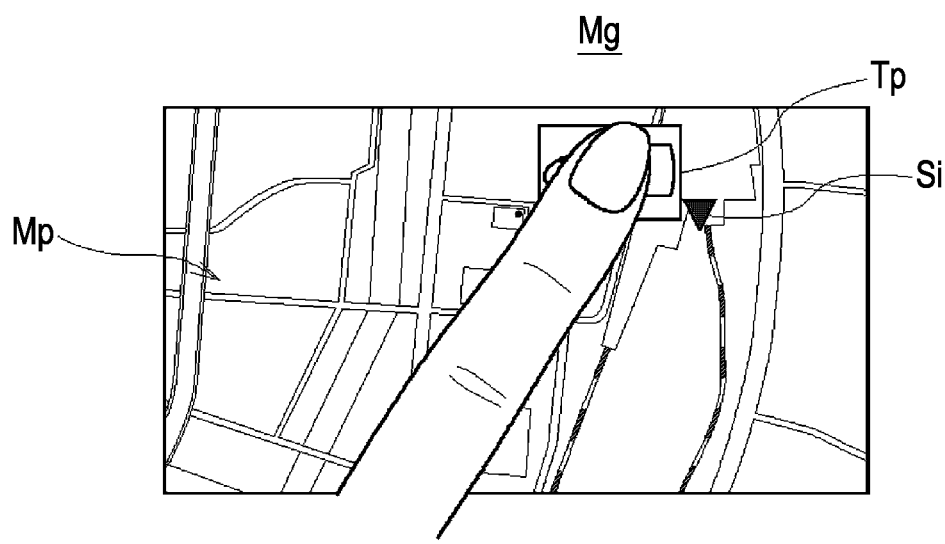
FIGS. 13A and 13B are schematic diagrams used for explaining a map screen according to the first embodiment.

For example, suppose that the user's finger is released from the touch screen 109 when the thumbnail image Tp is moved as shown in FIG. 13A. The CPU 110 corrects the shooting position of an image indicated by the thumbnail image Tp to the position of the shooting position icon Si at this time.

Figure 13B:
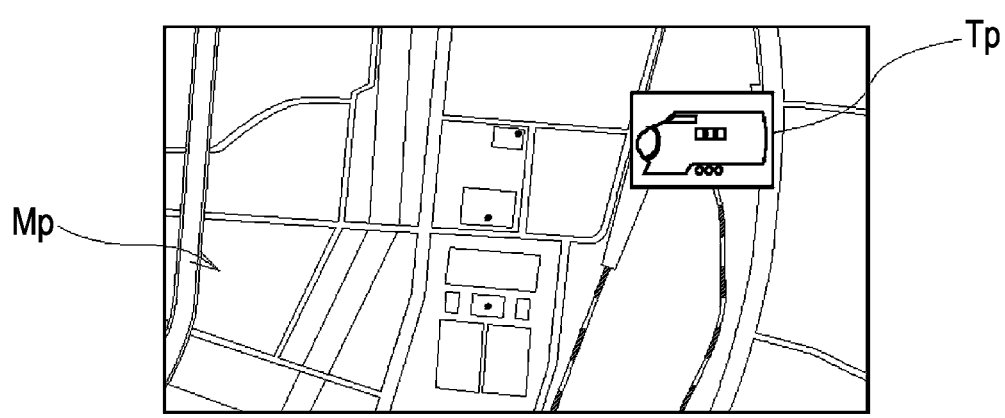

At this time, as shown in FIG. 13B, the CPU 110 displays the thumbnail image Tp at a position on the map image Mp corresponding to the corrected shooting position, and makes the shooting position icon Si invisible.

The CPU 110 corrects the shooting position of an image in this way, and ends the shooting position correction procedure RT2.

1-6. Operation and Effect according to First Embodiment

According to the configuration described above, on the basis of the optical intensity of light incident on the display screen of the touch screen 109, the CPU 110 of the DSC 100 detects a region where a user's finger is in contact with or in proximity to the display screen. Then, the CPU 110 detects this region as a region on the display screen which is hidden by the finger.

Then, when in the image list display mode, upon recognizing a long-press operation on a thumbnail image Tp via the touch screen 109, the CPU 110 displays the image menu icons Gm outside a region on the display screen which is hidden by the finger.

When in the map display mode, upon recognizing a drag operation on a thumbnail image Tp via the touch screen 109, the CPU 110 displays the shooting position icon Si outside a region on the display screen which is hidden by the finger.

That is, the CPU 110 is configured to display information associated with the touch position Rap (a point on the thumbnail image Tp in this case) outside a region on the display screen which is hidden by the finger, in accordance with the operating mode.

Thus, the DSC 100 can display information associated with the touch position Rap in such a way that the information is not hidden by the finger, thereby allowing the user to view the information with reliability regardless of how the user touches the display screen with the finger.

When, in the map display mode, an operation of touching a point on a thumbnail image Tp with a finger and moving the finger while keeping the finger in touch (i.e., a drag operation) is performed, the CPU 110 moves the thumbnail image Tp in accordance with the movement of the touch position Rap.

At the same time, the CPU 110 moves the shooting position icon Si in such a way that its position relative to the thumbnail image Tp does not change. That is, the CPU 110 moves the shooting position icon Si in such a way that its position relative to the touch position Rap does not change.

When the CPU 110 determines that the display position of the shooting position icon Si that has been moved lies outside the display screen of the touch screen 109, the CPU 110 moves the display position of the shooting position icon Si to a position inside the display screen and outside the region hidden by the finger.

In this way, the DSC 100 can display the shooting position icon Si in such a way that the shooting position icon Si is not hidden by the finger no matter to which position the thumbnail image Tp is moved, thereby allowing the user to view the shooting position icon Si with reliability.

According to the above-described configuration, the DSC 100 is configured to display information associated with the touch position Rap outside a region on the display screen of the touch screen 109 which is hidden by the finger.

Thus, the DSC 100 can display information associated with the touch position Rap in such a way that the information is not hidden by the finger, thereby allowing the user to view the information with reliability regardless of how the user touches the display screen with the finger. In this way, the DSC 100 makes it possible to further improve operability with the touch screen 109.

2. Second Embodiment 2-1. Overview of Second Embodiment

First, a second embodiment will be described. After describing an overview of the second embodiment, the description will move on to a specific example of this embodiment.

In FIG. 14 in which portions corresponding to those in FIG. 1 are denoted by the same reference numerals, reference numeral 50 denotes an information processing apparatus according to the second embodiment. The information processing apparatus 50 has the same position detecting section 3 and region detecting section 4 as those of the first embodiment described above.

The information processing apparatus 50 also has a determining section 51 that determines whether or not a pointing object is the user's right hand or the user's left hand, on the basis of the tilt of a region detected by the region detecting section 4 with respect to the display screen.

Further, the information processing apparatus 50 has a control section 52 configured to display information associated with a touch position when the touch position is detected by the position detecting section 3, outside the region detected by the region detecting section 4. The control section 52 is also configured to change the information to be displayed, in accordance with the result of determination by the determining section 51 as to whether a pointing object is the user's right hand or the user's left hand.

A detailed description will be given below of the DSC 100 as a specific example of the information processing apparatus 50 configured as described above. Since the hardware configuration of the DSC 100 is the same as the hardware configuration according to the first embodiment (FIG. 3), reference in this regard is to be made to the first embodiment.

In the second embodiment, the CPU 110 of the DSC 100 is the hardware corresponding to the determining section 51 and control section 52 of the information processing apparatus 50. Also, the touch screen 109 and the CPU 110 are the hardware corresponding to the position detecting section 3 and region detecting section 4 of the information processing apparatus 50.

2-2. Map Display Mode Operation Procedure

The DSC 100 according to the second embodiment is configured to change the kind of icon to be displayed on the basis of whether the user is operating the touch screen 109 with the right hand or the left hand when in the map display mode. Hereinbelow, an operating procedure in the case of an operation in this map display mode (this will be also referred to as map display mode operation procedure) will be described with reference to the flowchart shown in FIG. 15.

Incidentally, this map display mode operation procedure RT3 is a procedure that is executed by the CPU 110 of the DSC 100 in accordance with a program written in the program ROM 111.

When the map display mode is selected via the touch screen 109, the CPU 110 starts this map display mode operation procedure RT3, and transfers to step SP201.

In step SP201, the CPU 110 displays the same map screen Mg (FIG. 6) as that in the first embodiment described above on the touch screen 109, and transfers to the next step SP202.

In step SP202, the CPU 110 determines whether or not a point on a thumbnail image Tp has been touched with a finger.

If a negative result is obtained in this step SP202 because a point on a thumbnail image Tp has not been touched with a finger, the CPU 110 returns to step SP202 again. Then, the CPU 110 waits on standby until a point on a thumbnail image Tp is touched.

On the other hand, if a positive result is obtained in step SP202 because a point on a thumbnail image Tp has been touched with a finger, the CPU 110 transfers to the next step SP203.

In step SP203, the CPU 110 detects a region on the touch screen 109 which is hidden by the finger, via the touch screen 109 in the same manner as in the first embodiment described above, and transfers to step SP204.

In step SP204, the CPU 110 determines whether or not the user is operating the touch screen 109 with the right hand or the left hand, on the basis of the tilt of the region on the touch screen 109 hidden by the finger with respect to the display screen.

For example, as shown in FIG. 16A, suppose that a user's finger is touching the touch screen 109 from the lower right side, that is, the user is operating the touch screen 109 with the right hand. At this time, as shown in FIG. 16B, the CPU 110 detects each of a region Ra in contact with the finger and a region Rb in proximity to the finger, as a region that is hidden by the user's finger.

The CPU 110 detects the touch position Rap by detecting the region Ra in contact with the finger and the region Rb in proximity to the finger, and also detects the center of gravity Rbp of the region Rb in proximity to the finger as coordinates on the display screen of the touch screen 109.

Since the region Ra in contact with the finger is located toward the fingertip, it is considered that the touch position Rap as its center of gravity is located toward the fingertip. On the other hand, since the region Rb in proximity to the finger extends from the fingertip to the base of the finger, it is considered that its center of gravity Rbp is roughly at the middle of the finger and located on the finger's base side with respect to the touch position Rap. That is, it is considered that the positional relationship between the touch position Rap and the center of gravity Rbp is indicative of the positional relationship between the fingertip and the base of the finger.

When the user is operating with the right hand, it is considered that the base of the finger is located on the right side of the fingertip with respect to the display screen of the touch screen 109, and that the finger is tilted to the left toward the fingertip. Therefore, when the CPU 110 recognizes that the center of gravity Rbp is located on the right side of the touch position Rap and hence the region hidden by the finger is tilted to the left with respect to the display screen, the CPU 110 determines that the user is operating with the right hand.

On the other hand, as shown in FIG. 17A, suppose that a user's finger is touching the touch screen 109 from the lower left side, that is, the user is operating the touch screen 109 with the left hand. In this case, it is considered that the base of the finger is located on the left side of the fingertip with respect to the display screen of the touch screen 109, and that the finger is tilted to the right toward the fingertip. Therefore, when the CPU 110 recognizes that the center of gravity Rbp is located on the left side of the touch position Rap and hence the region hidden by the finger is tilted to the right with respect to the display screen as shown in FIG. 17B, the CPU 110 determines that the user is operating with the left hand.

If it is determined in this step SP204 (FIG. 15) that the user is operating the touch screen 109 with the right hand, the CPU 110 transfers to step SP205.

Figure 18A:
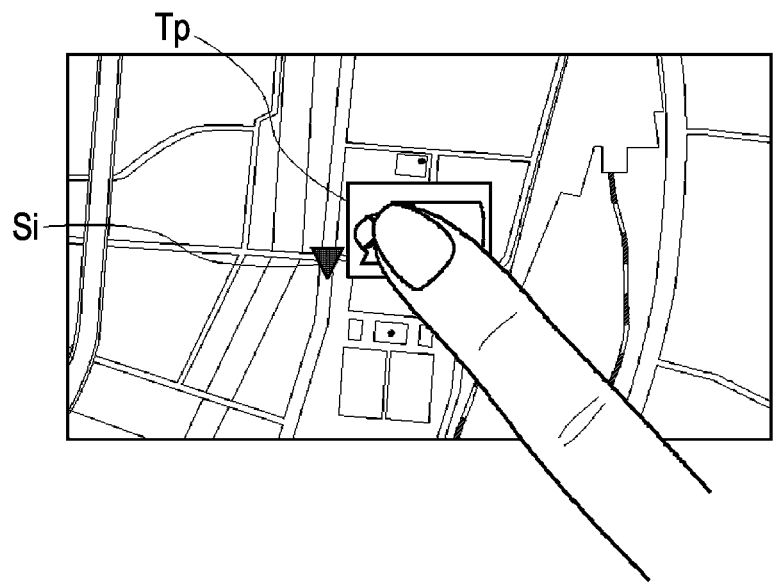
FIGS. 18A and 18B are schematic diagrams used for explaining a map screen according to the second embodiment.

In step SP205, as shown in FIG. 18A, the CPU 110 displays the same shooting position icon Si as that in the first embodiment, at a position that is outside the region on the touch screen 109 hidden by the finger and is adjacent to the thumbnail image Tp. Then, the CPU 110 transfers to step SP206.

In step SP206, the CPU 110 executes the same processing as in steps SP105 and SP106 of the shooting position correction procedure RT2 (FIG. 10) described above. That is, the CPU 110 moves the thumbnail image Tp and the shooting position icon Si in accordance with a drag operation on the thumbnail image Tp, and corrects the shooting position of an image to the position at which the shooting position icon Si is located on the map image Mp when the finger is released. Then, the CPU 110 ends the map display mode operation procedure RT3.

On the other hand, if it is determined in step S204 that the user is operating the touch screen 109 with the left hand, the CPU 110 transfers to step SP207.

Figure 18B:
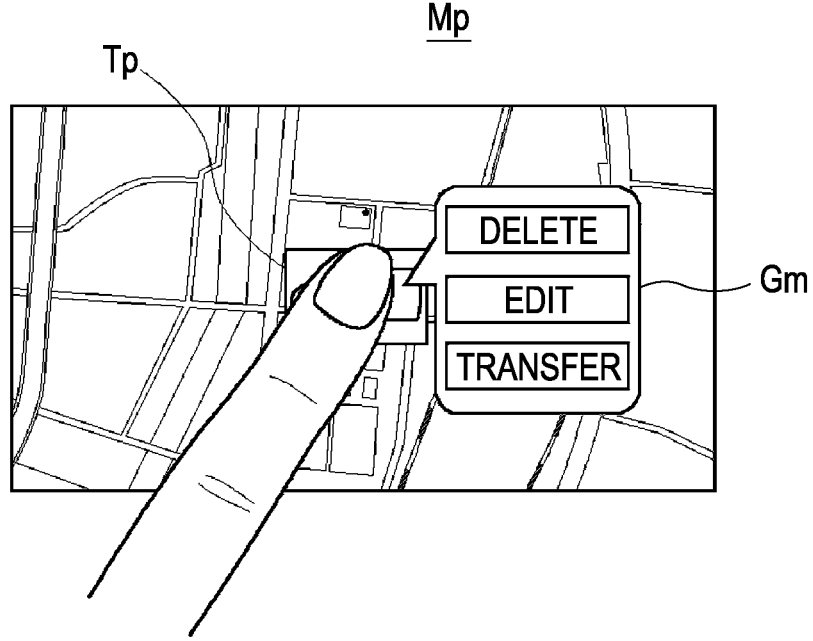

In step SP207, as shown in FIG. 18B, the CPU 110 displays the same image menu icons Gm as those in the first embodiment, at a position that is outside the region on the touch screen 109 hidden by the finger and is adjacent to the thumbnail image Tp. Then, the CPU 110 transfers to step SP208.

In step SP208, the CPU 110 executes the same processing as in steps SP5 to SP7 of the image menu display procedure RT1 (FIG. 7) described above. That is, the CPU 110 executes processing corresponding to a selected image menu icon Gm with respect to an image indicated by the touched thumbnail image Tp. Then, the CPU 110 ends the map display mode operation procedure RT3.

Through the map display mode operation procedure RT3 described above, the DSC 100 displays the shooting position icon Si or the image menu icons Gm while switching between these icons depending on whether the user is operating the touch screen 109 with the right hand or with the left hand.

That is, the DSC 100 allows two different kinds of icon to be displayed by simply changing the hand with which to perform a touch operation to the right hand or the left hand.

It should be noted that in the map display mode, a usage frequency (a presumed possibility of use by the user) is set in advance for each of the shooting position icon Si and the image menu icons Gm.

It is presumed that when in the map display mode, the function of correcting a shooting position is a function with a higher frequency of use by the user than the function of performing various kinds of processing on an image. Accordingly, the DSC 100 sets the shooting position icon Si as having a higher usage frequency than the image menu icons Gm.

Also, the DSC 100 sets the user's dominant hand as the right hand by default.

Due to such settings, in the case of an operation with the right hand that is the dominant hand, the CPU 110 is configured to display the shooting position icon Si having the higher usage frequency. On the other hand, in the case of an operation with the left hand that is not the dominant hand, the CPU 110 is configured to display the image menu icons Gm with the lower usage frequency.

In this way, the DSC 100 allows the user to view the icon with the higher usage frequency by simply making the user perform a touch operation with the dominant hand that is easier to operate with.

2-3. Tap Operation Procedure

When in the image list display mode, the DSC 100 is configured to change the processing to be executed, on the basis of whether a tap operation (operation of touching with a finger and then immediately releasing the finger) on a thumbnail image Tp has been done with the user's right hand or left hand. Hereinbelow, an operating procedure in the case of this tap operation on a thumbnail image Tp (this will be also referred to as tap operation procedure) will be described with reference to the flowchart shown in FIG. 19.

Incidentally, this tap operation procedure RT4 is a procedure that is executed by the CPU 110 of the DSC 100 in accordance with a program written in the program ROM 111.

When the image list display mode is selected via the touch screen 109, the CPU 110 displays the image list screen Ig (FIG. 5) on the touch screen 109, starting this tap operation procedure RT4, and transfers to step SP301.

In step SP301, the CPU 110 determines whether or not a tap operation on an arbitrary thumbnail image Tp has been performed via the touch screen 109.

Specifically, the CPU 110 determines that a tap operation on a thumbnail image Tp has been performed, when the CPU 110 recognizes that a point on the thumbnail image Tp has been touched with a finger via the touch screen 109 and then the finger has been released within a predetermined time.

If a negative result is obtained in this step SP301 because a tap operation has not been performed on an arbitrary thumbnail image Tp, the CPU 110 returns to step SP301 again, and waits on standby until a tap operation on a thumbnail image Tp is performed.

On the other hand, if a positive result is obtained in step SP301 because a tap operation has been performed on an arbitrary thumbnail image Tp, the CPU 110 recognizes that the image indicated by the arbitrary thumbnail image Tp has been selected, and transfers to the next step SP302.

In step SP302, the CPU 110 detects a region on the touch screen 109 which is hidden by the finger, via the touch screen 109 in the same manner as in the first embodiment described above, and transfers to step SP303.

In step SP303, as in the map display mode operation procedure RT3 described above, the CPU 110 determines whether or not the user has operated the touch screen 109 with the right hand or the left hand.

If it is determined in this step S303 that the user is operating the touch screen 109 with the right hand, the CPU 110 transfers to step SP304.

In step SP304, as shown in FIG. 20A, the CPU 110 displays an image P indicated by the tapped thumbnail image Tp on the entire display screen of the touch screen 109, and ends the tap operation procedure RT4.

On the other hand, if it is determined in step SP303 that the user is operating the touch screen 109 with the left hand, the CPU 110 transfers to step SP304.

In step SP305, the CPU 110 displays the image menu icons Gm at a position that is adjacent to the tapped thumbnail image Tp and is outside the region on the touch screen 109 hidden by the finger, and transfers to the next step SP306.

For example, as shown in FIG. 20B, suppose that the CPU 110 recognizes the lower left part of the thumbnail image Tp and the lower left side of the thumbnail image Tp as the region hidden by the finger.

At this time, the CPU 110 displays the image menu icons Gm at a position on the upper side of the thumbnail image Tp which is located adjacent to the thumbnail image Tp and is not hidden by the finger. It should be noted that the image menu icons Gm include the Delete menu icon Gm1, the Edit menu icon Gm2, and the Transfer menu icon Gm3 which are provided in a horizontal line.

In step SP306, the CPU 110 executes the same processing as in steps SP5 to SP7 of the image menu display procedure RT1 (FIG. 7) described above. That is, the CPU 110 executes processing corresponding to a selected image menu icon Gm with respect to an image indicated by the tapped thumbnail image Tp. Then, the CPU 110 ends the tap operation procedure RT4.

Through the tap operation procedure RT4 described above, when in the image list display mode, the DSC 100 is configured to change the processing to be executed, on the basis of whether a tap operation on the thumbnail image Tp has been done with the right hand or left hand.

That is, when performing a tap operation in the image list display mode, the DSC 100 allows two different kinds of command to be inputted by simply changing the hand with which to perform the tap operation to the right hand or the left hand.

In the image list display mode, a usage frequency is set in advance for each of the process of displaying the image menu icons Gm and the process of displaying an image on the entire display screen.

It is presumed that when in the image list display mode, the function of displaying an image on the entire display screen is a function with a higher frequency of use by the user than the function of performing various kinds of processing on the image. Accordingly, the DSC 100 sets the process of displaying an image on the entire display screen as having a higher usage frequency than the process of displaying the image menu icons Gm.

Also, the DSC 100 sets the user's dominant hand as the right hand by default.

Due to such settings, in the case of a tap operation with the right hand that is the dominant hand, the CPU 110 is configured to execute the process of displaying an image on the entire display screen which is a process with the higher usage frequency. On the other hand, in the case of an operation with the left hand that is not the dominant hand, the CPU 110 is configured to execute the process of displaying the image menu icons Gm which is a process with the lower usage frequency.

In this way, when in the list display mode, the DSC 100 allows the user to input the command for a process with the higher usage frequency by simply making the user perform a tap operation with the dominant hand that is easier to operate with.

2-4. Drag Operation Procedure

Further, when in the image list display mode, the DSC 100 is configured to change the processing to be executed, on the basis of whether a drag operation on a thumbnail image Tp has been done with the user's right hand or left hand. Hereinbelow, an operating procedure in the case of this drag operation on a thumbnail image Tp (this will be also referred to as drag operation procedure) will be described with reference to the flowchart shown in FIG. 21.

Incidentally, this drag operation procedure RT5 is a procedure that is executed by the CPU 110 of the DSC 100 in accordance with a program written in the program ROM 111.

When the image list display mode is selected via the touch screen 109, the CPU 110 displays the image list screen Ig (FIG. 5) on the touch screen 109, starting this drag operation procedure RT5, and transfers to step SP401.

In step SP401, the CPU 110 determines whether or not a drag operation on an arbitrary thumbnail image Tp has been started via the touch screen 109.

If a negative result is obtained in this step SP401 because a drag operation has not been performed on an arbitrary thumbnail image Tp, the CPU 110 returns to step SP401 again. Then, the CPU 110 waits on standby until a drag operation on an arbitrary thumbnail image Tp is started.

On the other hand, if a positive result is obtained in step SP401 because a drag operation on an arbitrary thumbnail image Tp has been started, the CPU 110 transfers to the next step SP402.

In step SP402, the CPU 110 detects a region on the touch screen 109 which is hidden by a finger, via the touch screen 109 in the same manner as in the first embodiment described above, and transfers to step SP403.

In step SP403, as in the map display mode operation procedure RT3 described above, the CPU 110 determines whether or not the user is operating the touch screen 109 with the right hand or the left hand.

If it is determined in this step S403 that the user is operating the touch screen 109 with the right hand, the CPU 110 transfers to step SP404.

In step SP404, as shown in FIG. 22A, the CPU 110 scrolls the entire image list screen Ig in accordance with a drag operation on the thumbnail image Tp, and transfers to the next step SP405.

In step SP405, the CPU 110 determines whether or not the user's finger has been released from the touch screen 109.

If a negative result is obtained in step SP405, this means that the drag operation on the thumbnail image Tp is being continued. At this time, the CPU 110 returns to step SP404, and continues the scroll of the image list screen Ig in accordance with the drag operation on the thumbnail image Tp.

On the other hand, if a positive result is obtained in step SP405, this means that the drag operation on the thumbnail image Tp has finished. At this time, the CPU 110 ends the scroll of the image list screen Ig, and ends the drag operation procedure RT5.

On the other hand, if it is determined in step SP403 that the user is operating the touch screen 109 with the left hand, the CPU 110 transfers to step SP406.

In step SP406, as shown in FIG. 22B, the CPU 110 causes only the thumbnail image Tp to be dragged (i.e., moved on the image list screen Ig) in accordance with the drag operation on the thumbnail image Tp, and transfers to the next step SP407.

In step SP407, the CPU 110 determines whether or not the user's finger has been released from the touch screen 109.

If a negative result is obtained in step SP407, this means that the drag operation on the thumbnail image Tp is being continued. At this time, the CPU 110 returns to step SP406, and continues the drag of the thumbnail image Tp in accordance with the drag operation on the thumbnail image Tp.

On the other hand, if a positive result is obtained in step SP407, this means that the drag operation on the thumbnail image Tp has finished. At this time, the CPU 110 fixes the display position of the thumbnail image Tp to the position where the finger is released, moves the display positions of the other thumbnail images Tp accordingly, and ends the drag operation procedure RT5.

Through the drag operation procedure RT5 described above, when in the image list display mode, the DSC 100 is configured to change the processing to be executed, on the basis of whether a drag operation on a thumbnail image Tp has been done with the right hand or left hand.

That is, when performing a drag operation in the image list display mode, the DSC 100 allows two different kinds of command to be inputted by simply changing the hand with which to perform the drag operation to the right hand or the left hand.

In the image list display mode, a usage frequency is set in advance for each of the process of dragging a thumbnail image Tp and the process of scrolling the image list screen Ig.

It is presumed that when in the image list display mode, the function of scrolling the image list screen Ig is a function with a higher frequency of use by the user than the function of dragging a thumbnail image Tp. Accordingly, the DSC 100 sets the process of scrolling the image list screen Ig as having a higher usage frequency than the process of dragging a thumbnail image Tp.

Also, the DSC 100 sets the user's dominant hand as the right hand by default.

Due to such settings, in the case of a drag operation with the right hand that is the dominant hand, the CPU 110 is configured to execute the process of scrolling the image list screen Ig which is a process with the higher usage frequency. On the other hand, in the case of a drag operation with the left hand that is not the dominant hand, the CPU 110 is configured to execute the process of dragging a thumbnail image Tp which is a process with the lower usage frequency.

In this way, when in the list display mode, the DSC 100 allows the user to input the command for a process with the higher usage frequency by simply making the user perform a drag operation with the dominant hand that is easier to operate with.

2-5. 3D Map Image Operation Procedure

Further, the DSC 100 has a 3D map display mode for displaying a 3D map image as an operating mode in addition to the shooting mode and the playback mode. When in the 3D map display mode, the DSC 100 is configured to change the processing to be executed, on the basis of whether a drag operation on a 3D map image has been done with the user's right hand or left hand. Hereinbelow, an operating procedure in the case of this drag operation on a 3D map image (this will be also referred to as 3D map image operation procedure) will be described with reference to the flowchart shown in FIG. 23.

Incidentally, this 3D map image operation procedure RT6 is a procedure that is executed by the CPU 110 of the DSC 100 in accordance with a program written in the program ROM 111.

When the 3D map display mode is selected via the touch screen 109, the CPU 110 starts this 3D map image operation procedure RT6, and transfers to step SP501.

In step SP501, the CPU 110 acquires current position information indicating the current position of the DSC 100 via the GPS module 122, and reads 3D map image data of the vicinity including the current position from the recording device 123 on the basis of the current position information.

Then, the CPU 110 generates a 3D map screen Dg shown in FIGS. 24A and 24B on the basis of the 3D map image data via the digital signal processing section 121, displays the 3D map screen Dg on the touch screen 109, and transfers to the next step SP502. On the 3D map screen Dg, a 3D map image Dp based on the 3D map image data is displayed in a state with the 3D map looked down from directly above, for example.

In step SP502, the CPU 110 determines whether or not a drag operation on the 3D map image Dp has been started via the touch screen 109.

If a negative result is obtained in this step SP502 because a drag operation has not been performed on the 3D map image Dp, the CPU 110 returns to step SP502 again. Then, the CPU 110 waits on standby until a drag operation on the 3D map image Dp is started.

On the other hand, if a positive result is obtained in step SP502 because a drag operation on the 3D map image Dp has been started, the CPU 110 transfers to the next step SP503.

In step SP503, the CPU 110 detects a region on the touch screen 109 which is hidden by a finger, via the touch screen 109 in the same manner as in the first embodiment described above, and transfers to step SP504.

In step SP504, as in the map display mode operation procedure RT3 described above, the CPU 110 determines whether or not the user is operating the touch screen 109 with the right hand or the left hand.

If it is determined in this step S504 that the user is operating the touch screen 109 with the right hand, the CPU 110 transfers to step SP505.

In step SP505, as shown in FIG. 24A, the CPU 110 scrolls the 3D map image in accordance with the drag operation on the 3D map image Dp, and transfers to the next step SP506.

In step SP506, the CPU 110 determines whether or not the user's finger has been released from the touch screen 109.

If a negative result is obtained in step SP506, this means that the drag operation on the 3D map image Dp is being continued. At this time, the CPU 110 returns to step SP505, and continues the scroll of the 3D map image Dp in accordance with the drag operation on the 3D map image Dp.

On the other hand, if a positive result is obtained in step SP506, this means that the drag operation on the 3D map image Dp has finished. At this time, the CPU 110 ends the scroll of the 3D map image Dp, and ends the 3D map image operation procedure RT6.

On the other hand, if it is determined in step SP504 that the user is operating the touch screen 109 with the left hand, the CPU 110 transfers to step SP507.

In step SP507, as shown in FIG. 24B, the CPU 110 changes the bird's-eye angle of the 3D map image Dp in accordance with the drag operation on the 3D map image Dp, and transfers to the next step SP508.

In step SP508, the CPU 110 determines whether or not the user's finger has been released from the touch screen 109.

If a negative result is obtained in step SP508, this means that the drag operation on the 3D map image Dp is being continued. At this time, the CPU 110 returns to step SP507, and continues the changing of the bird's-eye angle of the 3D map image Dp in accordance with the drag operation on the 3D map image Dp.

On the other hand, if a positive result is obtained in step SP508, this means that the drag operation on the 3D map image Dp has finished. At this time, the CPU 110 displays the 3D map image Dp by fixing the 3D map image Dp to the bird's-eye angle at the time when the finger is released, and ends the 3D map image operation procedure RT6.

Through the 3D map operation procedure RT6 described above, the DSC 100 is configured to change the processing to be executed, on the basis of whether a drag operation on the 3D map image has been done with the right hand or left hand.

That is, when performing a drag operation in the 3D map image display mode, the DSC 100 allows two different kinds of command to be inputted by simply changing the hand with which to perform the drag operation to the right hand or the left hand.

In the 3D map image display mode, a usage frequency is set in advance for each of the process of changing the bird's-eye angle of the 3D map image Dp and the process of scrolling the 3D map image Dp.

It is presumed that when in the 3D map image display mode, the function of scrolling the 3D map image Dp is a function with a higher frequency of use by the user than the function of changing the bird's-eye angle of the 3D map image Dp. Accordingly, the DSC 100 sets the process of scrolling the 3D map image Dp as having a higher usage frequency than the process of changing the bird's-eye angle of the 3D map image Dp.

Also, the DSC 100 sets the user's dominant hand as the right hand by default.

Due to such settings, in the case of a drag operation with the right hand that is the dominant hand, the CPU 110 is configured to execute the process of scrolling the 3D map image Dp which is a process with the higher usage frequency. On the other hand, in the case of a drag operation with the left hand that is not the dominant hand, the CPU 110 is configured to execute the process of changing the bird's-eye angle of the 3D map image Dp which is a process with the lower usage frequency.

In this way, when in the 3D map image display mode, the DSC 100 allows the user to input the command for a process with the higher usage frequency by simply making the user perform a drag operation with the dominant hand that is easier to operate with.

2-6. Operation and Effect according to Second Embodiment

According to the configuration described above, when in the map display mode of the DSC 100, the shooting position icon Si and the image menu icons Gm are associated with a point on a thumbnail image Tp as icons to be displayed when the point is touched.

When in the map display mode, upon recognizing that a thumbnail image Tp has been touched, the CPU 110 of the DSC 100 recognizes the tilt of a region on the display screen of the touch screen 109 hidden by a finger with respect to the display screen. The CPU 110 determines on the basis of the recognized tilt whether or not a pointing object touching the touch screen 109 is the user's right hand or left hand.

If it is determined that the pointing object is the user's right hand, the CPU 110 displays the shooting position icon Si associated with the point on the thumbnail image Tp (i.e., the touch position Rap), outside the region on the touch screen 109 which is hidden by the finger.

On the other hand, if it is determined that the pointing object is the user's left hand, the CPU 110 displays the image menu icons Gm associated with the point on the thumbnail image Tp (i.e., the touch position Rap), outside the region on the touch screen 109 which is hidden by the finger.

That is, when in the map display mode, the CPU 110 is configured to change the kind of icon to be displayed, depending on whether the pointing object touching the touch screen 109 is the user's right hand or the user's left hand.

Thus, the DSC 100 allows two kinds of icon to be displayed by simply changing the hand with which to perform a single tap operation to the right hand or left hand, without making the user perform a tap operation many times. In this way, the DSC 100 allows two kinds of icon to be displayed by an easy and intuitive operation.

Also, in the map display mode, a usage frequency is set in advance for each of the shooting position icon Si and the image menu icons Gm which are associated with a point on a thumbnail image Tp. As described above, in this case, the shooting position icon Si is set to have a higher usage frequency than the image menu icons Gm.

Then, if it is determined that the pointing object is the right hand which is set as the user's dominant hand in advance, the CPU 110 displays the icon with the higher usage frequency (i.e., the shooting position icon Si) of the icons associated with the touch position Rap.

Thus, the DSC 100 allows the user to view the icon with the higher usage frequency by simply making the user perform an operation with the dominant hand that is easier to operate with. That is, the DSC 100 enables a further improvement in operability.

When in the list display mode of the DSC 100, a tap operation on a thumbnail image Tp is associated with the process of displaying an image indicated by the thumbnail image Tp on the entire display screen and the process of displaying the image menu icons Gm.

Upon recognizing that a tap operation on a thumbnail image Tp has been performed, the CPU 110 determines whether or not the pointing object that has performed the tap operation is the user's right hand or left hand.

If it is determined that the pointing object is the right hand, the CPU 110 executes the process of displaying an image indicated by the thumbnail image Tp on the entire display screen, which is a process associated with the tap operation.

On the other hand, if it is determined that the pointing object is the left hand, the CPU 110 executes the process of displaying the image menu icons Gm, which is a process associated with the tap operation.

That is, the CPU 110 is configured to change the processing to be executed, depending on whether the user is operating the touch screen 109 with the right hand or the left hand.

Thus, the DSC 100 allows two kinds of command to be inputted by simply changing the hand with which to perform a single operation to the right hand or left hand, without making the user perform an operation many times. In this way, the DSC 100 allows two kinds of command to be inputted by an easy and intuitive operation.

In the list display mode, a usage frequency is set in advance for each of the process of displaying an image indicated by a thumbnail image Tp on the entire display screen and the process of displaying the image menu icons Gm, which are processes associated with a tap operation on the thumbnail image Tp. As described above, in this case, the process of displaying an image on the entire display screen is set to have a higher usage frequency than the process of displaying the image menu icons Gm.

Then, if it is determined that the pointing object is the right hand which is set as the user's dominant hand in advance, the CPU 110 is configured to execute the process with the higher usage frequency (i.e., the process of displaying an image on the entire display screen) of the processes associated with the tap operation.

Thus, the DSC 100 allows the user to input the command for a process with the higher usage frequency by simply making the user perform an operation with the dominant hand that is easier to operate with. That is, the DSC 100 enables a further improvement in operability.

Other than the above, the DSC 100 according to the second embodiment can provide the same effect as that of the first embodiment.

3. Other Embodiments

3-1. Another Embodiment 1

In the first embodiment described above, upon recognizing that a thumbnail image Tp has been touched, the CPU 110 is configured to display the Delete menu icon Gm1, the Edit menu icon Gm2, and the Transfer menu icon Gm3 in a predetermined placement.

The present invention is not limited to this. Alternatively, if a plurality of pieces of information are associated with the touch position Rap as described above, the CPU 110 may determine the placement of these pieces of information on the display screen on the basis of a priority such as a usage frequency or a recommendation index that is set for each of the pieces of information.

For example, suppose that the Delete menu icon Gm1 and the Transfer menu icon Gm3 are set to high priority because these icons are used frequently by the user. Also, suppose that the Edit menu icon Gm2 is set to low priority because this icon is used less frequently by the user than these icons.

When a long-press operation is performed on a thumbnail image Tp, the CPU 110 displays icons with the higher priority (i.e., the Delete menu icon Gm1 and the Transfer menu icon Gm3) by placing these icons outside a region hidden by a finger and near the touch position Rap. On the other hand, the CPU 110 displays an icon with the lower priority (i.e., the Edit menu icon Gm2) by placing the icon outside the region hidden by the finger and farther away from the touch position Tap than these icons.

Figure 25A:
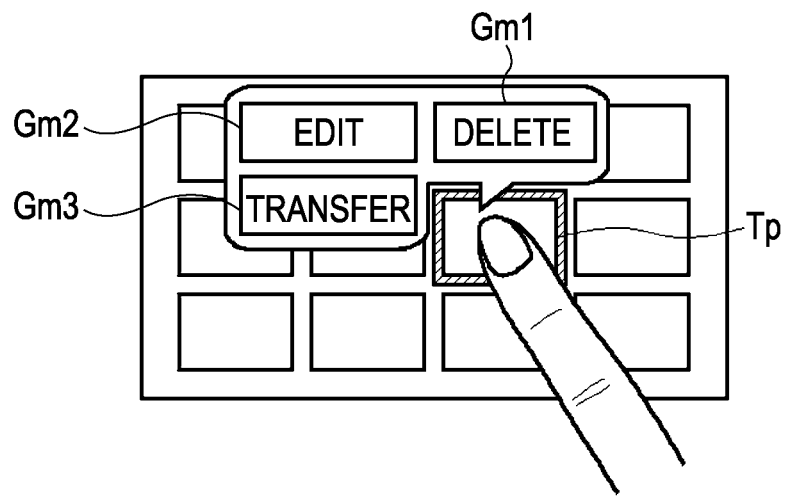
FIGS. 25A and 25B are schematic diagrams used for explaining an image list screen according to another embodiment.

For example, as shown in FIG. 25A, suppose that on the image list screen Ig, the lower right part of a thumbnail image Tp and the lower right side of the thumbnail image Tp are the region hidden by a finger.

In this case, the Delete menu icon Gm1 and the Transfer menu icon Gm3 are displayed at positions on the upper side and on the left side of the thumbnail image Tp (i.e., near the touch position Rap), which are located outside the region hidden by the finger. In addition, the CPU 110 displays the Edit menu icon Gm2 at a position on the diagonally upper left side of the thumbnail image Tp (i.e., farther away from the touch position Rap than the upper side and the lower side), which is located outside the region hidden by the finger.

Figure 25B:
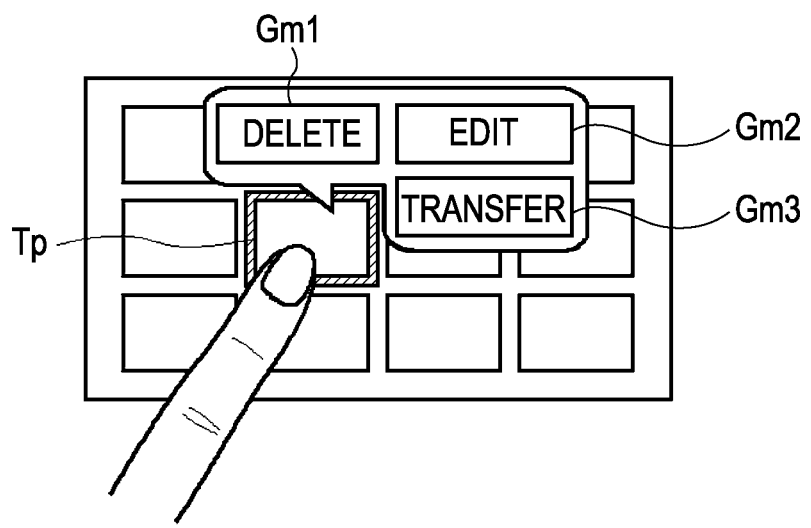

On the other hand, as shown in FIG. 25B, suppose that on the image list screen Ig, the lower left part of a thumbnail image Tp and the lower left side of the thumbnail image Tp are the region hidden by a finger.

In this case, the Delete menu icon Gm1 and the Transfer menu icon Gm3 are displayed at positions on the upper side and on the right side of the thumbnail image Tp (i.e., near the touch position Rap), which are located outside the region hidden by the finger. In addition, the CPU 110 displays the Edit menu icon Gm2 at a position on the diagonally upper right side of the thumbnail image Tp (i.e., farther away from the touch position Rap than the upper side and the lower side), which is located outside the region hidden by the finger.

That is, the CPU 110 places the three kinds of image menu icon Gm outside the region on the touch screen 109 hidden by the finger and in such a way that icons set to higher priority are placed closer to the touch position Rap.

In this way, the DSC 100 can display icons with higher priority for the user near the fingertip of the user, thus facilitating operation when the user selects an icon.

In addition, as in the first and second embodiments described above, the DSC 100 can display the image menu icons Gm so as not to be hidden by the finger, thereby allowing the user to view the image menu icons Gm with reliability.

3-2. Another Embodiment 2

The above-described second embodiment is directed to the case in which the user's dominant hand is set to the right hand by default.

The present invention is not limited to this. Alternatively, the user's dominant hand may be set in advance in accordance with a user's input.

For example, suppose that the CPU 110 sets the user's dominant hand is set as the left hand on the basis of a user's input. In this case, when in the map display mode, if it is determined that a touch operation on a thumbnail image Tp has been done with the left right that is set as the dominant hand, the CPU 110 displays the shooting position icon Si that is an icon with the higher usage frequency.

Also, when in the list display mode, if it is determined that a drag operation on a thumbnail image Tp has been done with the left right that is set as the dominant hand, the CPU 110 performs scrolling of the image list screen Ig which is a process with the higher usage frequency.

3-3. Another Embodiment 3

Further, the above-described first embodiment is directed to the case in which when in the list display mode, the CPU 110 is configured to display the image menu icons Gm outside a region on the touch screen 109 hidden by a finger, in response to a long-press operation on a thumbnail image Tp.

The present invention is not limited to this. Alternatively, the CPU 110 may display, in response to a long-press operation on a thumbnail image Tp, for example, an image related to the image indicated by the thumbnail image Tp (for example, a shot of the same person) outside the region.

In this case, if there are plurality of such related images, the CPU 110 may display the plurality of images outside the region.

The present invention is not limited to this. Alternatively, in response to a long-press operation on a thumbnail image Tp, the CPU 110 may display the thumbnail image Tp by moving the thumbnail image Tp to the outside of the region.

That is, the CPU 110 may display various other kinds of single or plurality of pieces of information outside the region, as long as such information is associated with the touch position Rap so as to be displayed in response to a touch on the touch position Rap.

3-4. Another Embodiment 4

Further, the above-described first embodiment is directed to the case in which the image menu icons Gm are displayed at a position that is located on either the right side or left side adjacent to the thumbnail image Tp being long-pressed, and is outside a region on the touch screen 109 hidden by a finger.

The present invention is not limited to this. Alternatively, the CPU 110 may display the image menu icons Gm at a position according to the touch position Rap and outside the region on the touch screen 109 hidden by the finger.

For example, suppose that the lower right side of a touched thumbnail image Tp is the region hidden by a finger, and the thumbnail image Tp is located near the upper end of the display screen of the touch screen 109. At this time, the CPU 110 displays the image menu icons Gm at a position on the diagonally lower left side of the thumbnail image Tp, which is located outside the region hidden by the finger and does not fall on the upper end of the display screen.

The present invention is not limited to this. Alternatively, the CPU 110 may display the image menu icons Gm at any other various positions as long as such a position is located outside the region on the touch screen 109 hidden by the finger.

3-5. Another Embodiment 5

Further, in the first and second embodiments described above, the CPU 110 is configured to detect each of a region in which a user's finger is in contact with the display screen of the touch screen 109 and a region in which the user's finger is in proximity to the display screen, as a region on the display screen which is hidden by the finger.

The present invention is not limited to this. Alternatively, the CPU 110 may detect either a region in which a user's finger is in contact with the display screen of the touch screen 109 or a region in which the user's finger is in proximity to the display screen, as a region on the display screen which is hidden by the finger.

3-6. Another Embodiment 6

Further, the above-described embodiments are directed to the case of using an optical sensor type touch screen 109. The present invention is not limited to this. Alternatively, any various other types of touch screen, such as a capacitive type or a resistive-film type one, may be used as long as such a touch screen is capable of detecting a region on the display screen which is hidden by a pointing object.

Further, the above-described embodiments are directed to the case in which a user's finger is used as a pointing object with which to operate the touch screen 109. The present invention is not limited to this. Alternatively, various other kinds of pointing object may be used, such as a pencil, a bar, and a dedicated touch pen.

In this case, in step SP204 of the map display mode operation procedure RT3 described above, the CPU 110 determines whether a pointing object with which the touch screen 109 is touched is an object operated with the right hand of the user or an object operated with the left hand.

3-7. Another Embodiment 7

Further, in the above-described embodiments, the DSC 100 serving as an information processing apparatus is provided with the touch screen 109 serving as a position detecting section and a region detecting section. Further, the DSC 100 is provided with the CPU 110 serving as a position detecting section, a region detecting section, a control section, and a determining section.

The present invention is not limited to this. Alternatively, the individual functional sections of the DSC 100 described above may be configured by various other hardware or software, as long as they have the same functions.

Further, in the above-described embodiments, the present invention is applied to the DSC 100. The present invention is not limited to this. Alternatively, the present invention may or can be applied to various other kinds of equipment such as a digital video camera, a personal computer, or a portable telephone, as long as such equipment has a display device that allows a touch operation. For example, the present invention may be applied to a navigation apparatus that displays a map image.

3-8. Another Embodiment 8

Further, in the above-described embodiment, a program for executing various kinds of processing is written in the program ROM 111 of the DSC 100 in advance.

The present invention is not limited to this. Alternatively, this program may be recorded in advance on, for example, a recording medium such as a memory card, and the CPU 110 of the DSC 100 may execute this program by reading the program from the recording medium. In addition, the program read from the recording medium may be installed into the EEPROM 124.

3-9. Another Embodiment 9

Further, the present invention is not limited to the first and second embodiments and the other embodiments described above. That is, the scope of the present invention encompasses embodiments obtained by combining part or all of the first and second embodiments and the other embodiments described above in an arbitrary manner, or embodiments obtained by partially extracting these embodiments.

The present application contains subject matter related to that disclosed in Japanese Priority Patent Application JP 2009-174430 filed in the Japan Patent Office on Jul. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a position detecting section configured to detect a touch position at which a touching portion of a touching object touches a display screen of a display section during a touch operation, the touch operation involving the touching object rotating about an axis orthogonal to the display screen;
a control section configured to determine, in response to the touch operation and based at least in part on a position of the touching portion of the touching object during the touch operation and a position of a base of the touching object during the touch operation, whether the touch operation is a right-hand operation or a left-hand operation; and
a region detecting section configured to detect, based at least in part on the determination by the control section whether the touch operation involving the touching object rotating about an axis orthogonal to the display screen is a right-hand operation or a left-hand operation, a region on the display screen which is hidden by the touching object the touch operation;
wherein the control section is further configured to:
if it is determined that the touch operation is a right-hand operation, cause first information associated with the touch position to be displayed outside the detected region on the display screen detected by the region detecting section; and
if it is determined that the touch operation is a left-hand operation, cause second information, different than the first information, to be displayed outside the detected region on the display screen detected by the region detecting section.

2. The information processing apparatus according to claim 1, wherein:

a usage frequency is set for each piece of the information associated with the touch position; and the control section displays at least one piece of the information with a determined higher usage frequency if it is determined by the determining section that the touching object is on a dominant hand of the user which is set in advance.

3. The information processing apparatus according to claim 2, wherein:

the dominant hand of the user is set based on user input.

4. The information processing apparatus according to claim 2, wherein:

the control section displays the at least one piece of the information with a determined lower usage frequency if it is determined by the determining section that the user's finger touching object is on a hand of the user different from the dominant hand.

5. The information processing apparatus according to claim 1, wherein:

when the touch position is moved while the touching portion of the touching object is kept touching the display screen after displaying the information, the control section moves a display position of the information in accordance with the movement of the touch position so that its relative position with respect to the touch position does not change, and if it is determined that the moved display position of the information lies outside the display screen, the control section moves the display position of the information to a position inside the display screen and outside the region on the display screen.

6. The information processing apparatus according to claim 1, wherein:

a plurality of pieces of information are associated with the touch position; and the control section determines placement of the plurality of pieces of information on the display screen on the basis of a priority set for each of the plurality of pieces of information.

7. The information processing apparatus according to claim 1, wherein the region detecting section detects at least one of a region on the display screen which is in contact with the touching portion of the touching object and a region on the display screen which is in proximity to the base of the touching object, as the region on the display screen which is hidden by the touching object.

8. The information processing apparatus according to claim 1, wherein:

the first information comprises at least one icon of a first type; and the second information comprises at least one icon of a second type.

9. The information processing apparatus according to claim 8, wherein:

the at least one icon of the first type comprises at least one image menu icon or at least one shooting position icon; and the at least one icon of the second type comprises at least one image menu icon or at least one shooting position icon.

10. The information processing apparatus according to claim 1, further configured to display a plurality of icons on the display screen, wherein:

if the position detecting section detects the touch position of a touch operation performed by the touching portion of the touching object indicates a selection of at least one icon of the plurality of icons, the control section causes the information associated with the touch position to be displayed, if the information comprises the first information, the first information comprises a first representation of information associated with the at least one icon, and if the information comprises the second information, the second information comprises a second representation of information associated with the at least one icon.

11. The information processing apparatus according to claim 10, wherein:

the position detecting section detects the touch position based on a tap operation; and at least one of the first representation and the second representation comprises a display of an image associated with the at least one icon on the entire display screen.

12. The information processing apparatus according to claim 10, wherein:

the position detecting section detects the touch position based on a drag operation;

at least one of the first representation and the second representation is based on scrolling the plurality of icons on the display screen; and at least one of the first representation and the second representation is based on dragging the at least one icon on the display screen.

13. A display method comprising acts of:

detecting, by a position detecting section of an information processing apparatus, a touch position at which a touching portion of a touching object touches a display screen of a display section during a touch operation, the touch operation involving the touching object rotating about an axis orthogonal to the display screen;

determining, in response to the touch operation and based at least in part on a position of the touching portion of the touching object during the touch operation and a position of a base of the touching object during the touch operation, whether the touch operation is a right-hand operation or a left-hand operation;

detecting, based at least in part on the determination whether the touch operation involving the touching object rotating about an axis orthogonal to the display screen is a right-hand operation or a left-hand operation, a region on the display screen which is hidden by the touching object the touch operation;

if it is determined that the touch operation is a right-hand operation, causing first information associated with the touch position to be displayed outside the detected region; and if it is determined that the touch operation is a left-hand operation, causing second information, different than the first information, associated with the touch position to be displayed outside the detected region on the display screen.

14. The display method according to claim 13, wherein a usage frequency is set for each piece of the information associated with the touch position;

the display method further comprising displaying at least one piece of the information with a determined higher usage frequency if it is determined that the touching object is on a dominant hand of the user which is set in advance.

15. The display method according to claim 14, further comprising:

displaying the at least one piece of the information with a determined lower usage frequency if it is determined that the touching object is on a hand of the user different from the dominant hand.

16. The display method according to claim 13, further comprising:
   displaying a plurality of icons on the display screen; and
   when the touch position of the touching portion of the touching object indicates a selection of at least one icon of the plurality of icons, displaying information associated with the at least one icon.

17. The display method according to claim 16, wherein:
   the touch position is detected based on a tap operation with respect to the at least one icon; and
   the displayed information comprises a display of an image associated with the at least one icon on the entire display screen.

18. The display method according to claim 13, further comprising:
   displaying a map on the display screen; and
   when the touch position of the touch operation performed by the touching portion of the touching object indicates a selection of a portion of the map, causing information associated with the touch position to be displayed so that at least one of the first information and the second information is displayed based on scrolling of the map and at least one of the first information and the second information is displayed based on changing a bird's eye viewing angle of the map.

19. The display method according to claim 18, wherein:
   the map comprises a three-dimensional map.

20. At least one non-transitory computer-readable storage device storing computer-executable instructions that, when executed by at least one processor, cause an information processing apparatus to perform acts comprising:
   detecting, by a position detecting section of an information processing apparatus, a touch position at which a touching portion of a touching object touches a display screen of a display section during a touch operation, the touch operation involving the touching object rotating about an axis orthogonal to the display screen;
   determining, in response to the touch operation and based at least in part on a position of the touching portion of the touching object during the touch operation and a position of a base of the touching object during the touch operation, whether the touch operation is a right-hand operation or a left-hand operation;
   detecting, based at least in part on the determination whether the touch operation involving the touching object rotating about an axis orthogonal to the display screen is a right-hand operation or a left-hand operation, a region on the display screen which is hidden by the touching object the touch operation;
   if it is determined that the touch operation is a right-hand operation, causing first information associated with the touch position to be displayed outside the detected region; and
   if it is determined that the touch operation is a left-hand operation, causing second information, different than the first information, associated with the touch position to be displayed outside the detected region on the display screen.

21. The at least one non-transitory computer-readable storage device according to claim 20, wherein the touch operation comprises a tap operation or a drag operation.

* * * * *